US011638302B2

(12) United States Patent
Thyagarajan et al.

(10) Patent No.: US 11,638,302 B2
(45) Date of Patent: Apr. 25, 2023

(54) CHANNEL OCCUPANCY TIME (COT)-STRUCTURE INDICATION

(71) Applicant: QUALCOMM INCORPORATED, San Diego, CA (US)

(72) Inventors: Ananta Narayanan Thyagarajan, Bangalore (IN); Kapil Bhattad, Bangalore (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 16/990,352

(22) Filed: Aug. 11, 2020

(65) Prior Publication Data

US 2021/0051720 A1    Feb. 18, 2021

(30) Foreign Application Priority Data

Aug. 15, 2019   (IN) .............................. 201941033013

(51) Int. Cl.
    *H04W 74/08*      (2009.01)
    *H04W 72/14*      (2009.01)
    (Continued)

(52) U.S. Cl.
    CPC ....... *H04W 74/0816* (2013.01); *H04L 5/0048* (2013.01); *H04W 72/042* (2013.01);
    (Continued)

(58) Field of Classification Search
    CPC ............. H04W 72/12; H04W 72/1289; H04W 72/042; H04W 74/006; H04W 72/1268;
    (Continued)

(56) References Cited

U.S. PATENT DOCUMENTS

2020/0229241 A1*   7/2020  Jeon .................. H04W 74/0833
2020/0404708 A1*  12/2020  Zhang ................... H04W 16/14
2022/0150917 A1*   5/2022  Wang ................ H04W 72/1242

OTHER PUBLICATIONS

Zhang et al., Channel Access Mechanism for Random Access Channel in Unlicensed Spectrum, Oct. 26, 2018, U.S. Appl. No. 62/751,460 (US 2020/0404708 A1) (Year: 2018).*

(Continued)

*Primary Examiner* — Ian N Moore
*Assistant Examiner* — Brian T Le
(74) *Attorney, Agent, or Firm* — Haynes & Boone, LLP

(57) ABSTRACT

Wireless communications systems and methods related to communicating a structure of a channel occupancy time (COT) are provided. A first wireless communication device communicates with a second wireless communication device, a first indicator indicating at least one of a subband configuration for a COT or a duration of the COT. The first wireless communication device communicates with the second wireless communication device during the COT, a first communication signal based on at least one of the subband configuration for the COT or the duration of the COT. The first wireless communication device communicates with the second wireless communication device during the COT, a second indicator indicating an update for at least one of the subband configuration for the COT or the duration of the COT. Additionally, the first wireless communication device communicates with the second wireless communication device during the COT, a second communication signal based on the update.

28 Claims, 14 Drawing Sheets

(51) Int. Cl.
H04L 5/00 (2006.01)
H04W 72/12 (2009.01)
H04W 72/04 (2009.01)
H04W 72/1273 (2023.01)
H04W 72/1268 (2023.01)

(52) U.S. Cl.
CPC ... H04W 72/1268 (2013.01); H04W 72/1273 (2013.01); H04W 72/14 (2013.01)

(58) Field of Classification Search
CPC .............. H04W 72/1273; H04W 72/14; H04W 74/0816; H04W 28/12; H04L 5/00; H04L 5/001; H04L 5/003; H04L 5/0048
See application file for complete search history.

(56) References Cited

OTHER PUBLICATIONS

Qualcomm Incorporated: "Wideband Operation for NR-U",3GPP Draft, R1-1907265, 3GPP TSG RAN WG1 Meeting #97, 7.2.2.2.5 Wideband Operation for NR-U Operation, 3rd Generation Partnership Project (3GPP), Route Des Lucioles, F-06921 Sophia-Antipolis Cedex, vol. RAN WG1, No. Reno, US, May 13, 2019-May 17, 2019, May 13, 2019 (May 13, 2019), XP051728705, Retrieved from the Internet: URL:http:// vww_3nnn.ora/flo/Meetinas% 5 F3G PP%5FSYNC/RAN 1 / Docs/R 1%2D1907265%2Ezio [retrieved on May 13, 2019].

Mediatek Inc: "Wideband Operation for NR-U", 3GPP Draft, 3GPP TSG RAN WG1 #97, R1-1906547_Wideband Operation for NR-U_MTK_Final, 3rd Generation Partnership Project,Sophia-Antipolis Cedex, France, vol. RAN WG1, No. Reno, USA, May 13, 2019-May 17, 2019, May 13, 2019 (May 13, 2019), XP051727998,Retrieved from the Internet: URL: http://www.3gpp.org/o/Meetings%5F3G PP%5FSYNC/RAN 1 / Docs/R1%2D1906547%2Ezip retrieved on May 13, 2019.

VIVO: "Discussion on Wideband Operation in NR-U", 3GPP Draft, R1-1906134, 3GPP TSG RAN WG1 #97, 3rd Generation Partnership Project (3GPP), Sophia-Antipolis Cedex, France, vol. RAN WG1, No. Reno, USA, May 13, 2019-May 17, 2019, May 13, 2019 (May 13, 2019), XP051727590, Retrieved from the Internet: URL:http:// www.3gpp.org/flp/Meetings%5F3G PP%5FSYNC/RAN 1 Docs/1% 2D1906134%2Ezio [retrieved on May 13, 2019].

Huawei, et al., "NRU Wideband BWP Operation", 3GPP Draft, R1-1906048, 3GPP TSG RAN WG1 Meeting #97, 3rd Generation Partnership Project (3GPP), Sophia-Antipolis Cedex, France, vol. RAN WG1, No. Reno, USA, May 13, 2019-May 17, 2019, May 13, 2019 (May 13, 2019), XP051727505,, Retrieved from the Internet: URL:http://www.3gpp.org/flp/Meetings%5F3G PP%5FSYNC/ RAN 1 /Docs/R1%2D1906048%2Ezip [retrieved on May 13, 2019].

Ericsson: "DL Signals and Channels for NR-U", 3GPP Draft, 3GPP TSG-RAN WG1 Meeting #97, R1-1907452, DL Signals and Channels for NR-U, 3rd Generation Partnership Project (3GPP), Sophia-Antipolis Cedex, France, vol. RAN WG1, No. Reno, Nevada, USA; May 13, 2019-May 17, 2019, May 13, 2019 (May 13, 2019), XP051728883, Retrieved from the Internet: URL:http://www.3gpp.prg/ftp/meetings%5F3GPP%5FSYNC/RAN_1_/_Docs/R1% 2D1907452%2Ezip. Retrieved May 13, 2019.

Qualcomm Incorporated: "DL Signals and Channels for NR-U," 3GPP Draft, 3GPP R1-1907259, 7.2.2.1.2 DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Reno, US, May 13, 2019-May 17, 2019, May 13, 2019 (May 13, 2019), XP051728699, Retrieved from the Inernet: URL:http://www.3gpp.org/ftp/Meetings% 5F3GPP%5FSYNC/RAN1/ Oocs/R1%2O1907259%2Ezip. Retrieved on May 13, 2019.

International Search Report—PCT/US2020/045851—ISA/EPO—dated Oct. 27, 2020.

* cited by examiner

900

| Bit combination of index (assuming 4 bits) | Remaining COT duration (X) |
|---|---|
| 0-6 | 1-7 symbols |
| 7, 8, 9, 10 | 8, 10, 12, 14 symbols |
| 11 | >1 slot |
| 12 | >2 slots |
| 13 | >3 slots |
| 14 | >4 slots |
| 15 | >5 slots |

CHANNEL OCCUPANCY TIME (COT)-STRUCTURE INDICATION

CROSS REFERENCE TO RELATED APPLICATIONS & PRIORITY CLAIM

The present application claims priority to and the benefit of the Indian Provisional Patent Application No. 201941033013 filed Aug. 15, 2019, which is hereby incorporated by reference in its entirety as if fully set forth below and for all applicable purposes.

TECHNICAL FIELD

This application relates to wireless communication systems, and more particularly to a channel occupancy time (COT)-structure indication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first indicator indicating at least one of a subband configuration for a channel occupancy time (COT) or a duration of the COT; communicating, by the first wireless communication device with the second wireless communication device during the COT, a first communication signal based on the at least one of the subband configuration for the COT or the duration of the COT; communicating, by the first wireless communication device with the second wireless communication device during the COT, a second indicator indicating an update for the at least one of the subband configuration for the COT or the duration of the COT; and communicating, by the first wireless communication device with the second wireless communication device during the COT, a second communication signal based on the update.

In an additional aspect of the disclosure, an apparatus includes a transceiver configured to: communicate, by a first wireless communication device with a second wireless communication device, a first indicator indicating at least one of a subband configuration for a channel occupancy time (COT) or a duration of the COT; communicate, by the first wireless communication device with the second wireless communication device during the COT, a first communication signal based on the at least one of the subband configuration for the COT or the duration of the COT; communicate, by the first wireless communication device with the second wireless communication device during the COT, a second indicator indicating an update for the at least one of the subband configuration for the COT or the duration of the COT; and communicate, by the first wireless communication device with the second wireless communication device during the COT, a second communication signal based on the update.

In an additional aspect of the disclosure, a computer-readable medium having program code recorded thereon, the program code includes code for causing a first wireless communication device to communicate with a second wireless communication device, a first indicator indicating at least one of a subband configuration for a channel occupancy time (COT) or a duration of the COT; code for causing the first wireless communication device to communicate with the second wireless communication device, a first communication signal based on the at least one of the subband configuration for the COT or the duration of the COT; code for causing the first wireless communication device to communicate with the second wireless communication device, a second indicator indicating an update for the at least one of the subband configuration for the COT or the duration of the COT; and code for causing the first wireless communication device to communicate with the second wireless communication device, a second communication signal based on the update.

In an additional aspect of the disclosure, an apparatus includes means for communicating with a second wireless communication device, a first indicator indicating at least one of a subband configuration for a channel occupancy time (COT) or a duration of the COT; means for communicating with the second wireless communication device during the COT, a first communication signal based on the at least one of the subband configuration for the COT or the duration of the COT; means for communicating with the second wireless communication device during the COT, a second indicator indicating an update for the at least one of the subband configuration for the COT or the duration of the COT; and means for communicating with the second wireless communication device during the COT, a second communication signal based on the update.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
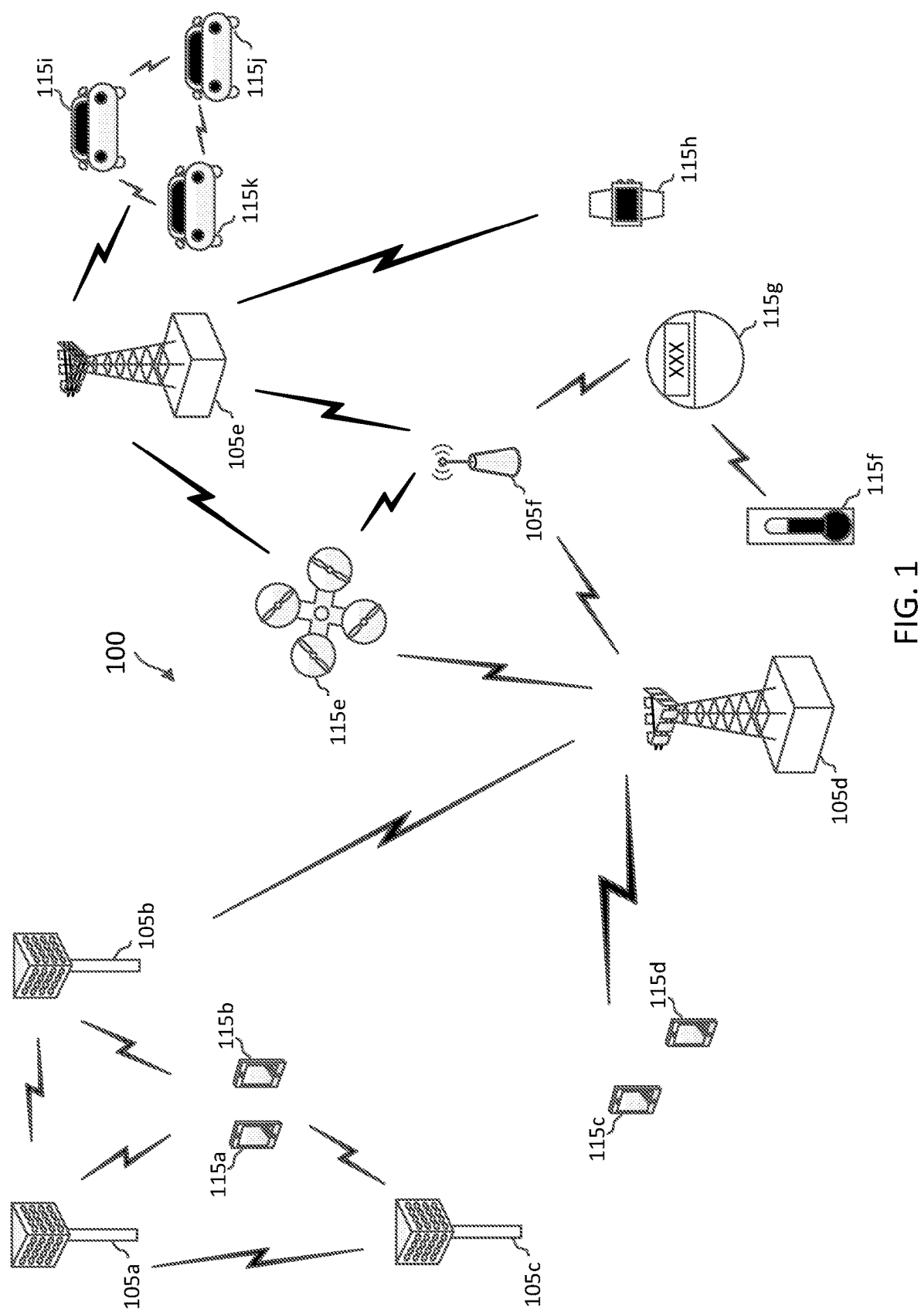
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Operations in shared or unlicensed spectrum may include DL transmissions and/or UL transmissions. The BSs and the UEs may be operated by multiple network operating entities sharing resources in the shared or unlicensed frequency spectrum and may perform a listen-before-talk (LBT) procedure (e.g., clear channel assessment (CCA)) prior to communicating to determine whether the frequency band is available. LBT is a channel access scheme that may be used in the unlicensed spectrum. In an example, a wireless communication device (e.g., the BS or the UE) may employ an LBT procedure to reserve a channel occupancy time (COT) in the shared medium for communications.

The present application provides techniques for communicating information on the structure of a COT. In an example, the BS may perform LBT in each subband of a plurality of subbands independently and use those subbands in which the LBT passes. The BS may pre-prepare a COT indicator that indicates the BS's subband usage for the plurality of subbands before an LBT passes in a subband. Accordingly, the BS may be unable to prepare and transmit accurate subband usage information in the first COT indicator transmitted to the UE. In an example, the first COT indicator may indicate that the BS's subband usage is unknown. The BS may transmit a second COT indicator to the UE, where the second COT indicator updates the subband usage information indicated in the first COT indicator. The second COT indicator may indicate the BS's accurate subband usage for the plurality of subbands. The UE may communicate communication signals based on whether the BS's subband usage is unknown and/or known. In another example, if the COT indicator indicates the remaining duration of the COT in symbols, the bits used to represent the remaining COT duration in the DCI may be large if the remaining COT duration is long. The present disclosure provides techniques for reducing the number of bits when indicating the remaining duration of a COT. The UE may communicate communication signals based on the remaining COT duration.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

The UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical downlink control channel (PDCCH). The BS 105 may transmit a DL communication signal to the UE 115 via a physical downlink shared channel (PDSCH) according to a DL scheduling grant. The UE 115 may transmit an UL communication signal to the BS 105 via a physical uplink shared channel (PUSCH) and/or physical uplink control channel (PUCCH) according to an UL scheduling grant.

In an embodiment, the network 100 may operate over shared frequency bands or unlicensed frequency bands, for example, at about 3.5 gigahertz (GHz), sub-6 GHz or higher frequencies in the mmWave band. The network 100 may partition a frequency band into multiple channels or subbands, for example, each occupying about 20 megahertz (MHz). In an example, a wireless communication device (e.g., the BS 105 or the UE 115) may employ an LBT procedure to reserve a channel occupancy time (COT) in the shared medium for communications. A COT may also be referred to as a transmission opportunity (TXOP). COTs may be non-continuous in time and may refer to an amount of time a station can send frames when it has won contention for the wireless medium. Each COT may include a plurality of slots and one or more medium sensing periods. A transmitting node may listen to one or more subbands (e.g., channels) within the frequency spectrum.

In an example, the BS 105 may perform an LBT in one or more frequency subbands prior to transmitting in the respective subband and may transmit in one or more subbands based on the LBT result. The BS 105 may perform the LBT based on energy detection and/or signal detection. The LBT that may result may be a pass if the channel signal energy is below a threshold and/or no reservation signal is detected. The LBT that may result may be a failure if the channel signal energy is above a threshold and/or a reservation signal is detected. The BS 105 may perform an LBT on each subband independently. If the BS reserves a COT in the subband (subband is available and performance of the LBT results in a LBT pass for the subband), the BS 105 may perform a DL transmission, receive a UL transmission from the UE 115, and/or schedule the UE 115 for data transmission and/or reception in the subband and within the COT. If the BS is unable to reserve a COT in the subband (subband is unavailable and performance of the LBT results in a LBT fail), the BS 105 may back off and perform the LBT procedure in the subband again at a later point in time. In another example, the UE 115 may perform an LBT in one or more subbands prior to transmitting in the respective subband and may transmit in one or more subbands based on the LBT result. The UE 105 may perform an LBT on each subband independently. If the UE 115 reserves a COT in the subband (subband is available and performance of the LBT results in a LBT pass for the subband), the UE 115 may perform an UL transmission or receive a DL transmission from the BS 105. If the UE 115 is unable to reserve a COT in the subband (subband is unavailable and performance of the LBT results in a LBT fail), the UE 115 may back off and perform the LBT procedure again at a later point in time.

An LBT may be in a variety of modes. An LBT mode may be, for example, a category 4 LBT or a category 2 LBT. A category 2 LBT refers to an LBT without a random backoff period. A category 4 LBT refers to an LBT with a random backoff and a variable contention window (CW). By default, the UE 115 may perform a category 4 LBT for UL transmissions. If the UE 115 can transmit an UL transmission during a COT reserved by the BS 105, the UE 115 may switch from performing the category 4 LBT to the category 2 LBT. If the category 2 LBT results in an LBT pass, the UE 115 may transmit the UL transmission during the COT.

Figure 2:
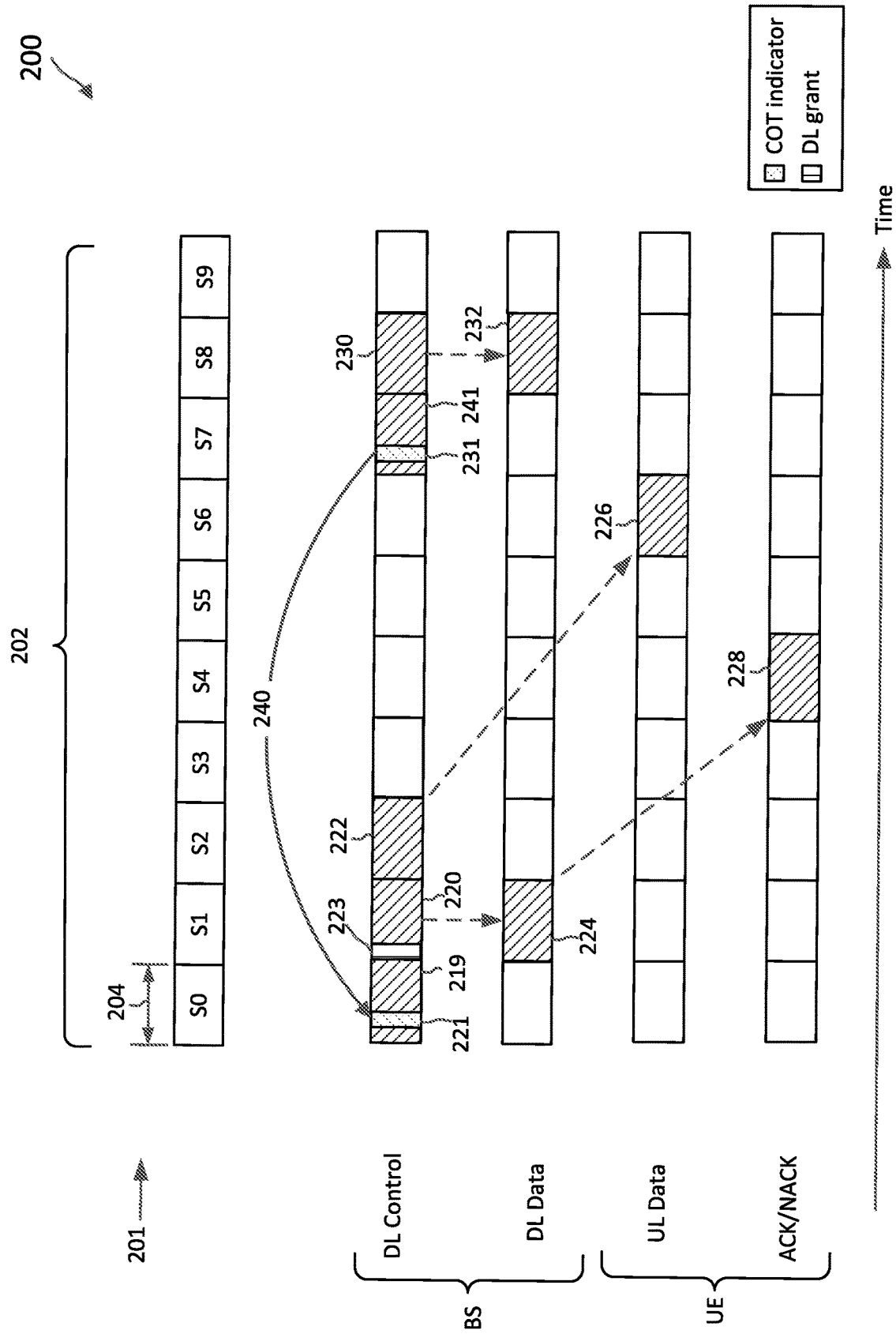
FIG. 2 illustrates a communication scheme for communicating indicators indicating a channel occupancy time (COT) structure according to some embodiments of the present disclosure.

FIG. 2 illustrates a communication scheme 200 for communicating indicators indicating a COT structure according to some embodiments of the present disclosure. The communication scheme 200 may correspond to a scheme communicated between a BS 105 and a UE 115 of the network 100. In FIG. 2, the x-axis represents time in some constant units. FIG. 2 shows a frame structure 201 of a COT 202 in a shared frequency spectrum. The COT 202 includes a plurality of slots 204 in time. The COT 202 includes ten slots 204 indexed from S0 to S9. The number of slots within a COT may vary depending on the embodiments. The COT 202 may be, for example, two ms and within the COT 202, multiple UL and DL transmissions may occur to and/or from the BS 105 or other wireless communication devices operating in the shared medium.

A BS may communicate with a UE in units of slots. The slots may also be referred to as TTIs. Each slot or TTI may carry a medium access control (MAC) layer transport block. Each slot may include a number of symbols in time and a number of frequency tones in frequency. Additionally, each slot may include a DL control portion followed by at least one of a subsequent DL data portion, UL data portion, and/or an UL control portion. In the context of LTE or NR, the DL control portion, the DL data portion, the UL data portion, and the UL control portion may be referred to as a PDCCH, a PDSCH, a PUSCH, and a PUCCH, respectively. As discussed, the BS may transmit DL data to the UE. In turn, the UE may transmit feedback for the DL data to the BS. The feedback may be an acknowledgement (ACK) indicating that reception of the DL data by the UE is successful or may be a negative-acknowledgement (NACK) indicating that reception of the DL data by the UE is unsuccessful (e.g., including an error or failing an error correction).

Additionally, the pattern-filled boxes represent transmissions of DL control information (DCI), DL data, UL data, an ACK, and/or an NACK in corresponding slots. While an entire slot is pattern-filled, a transmission may occur only in a corresponding portion of the slot. Additionally, a BS may indicate scheduling information using relative timing (e.g., an offset time period relative to a current time period in which the scheduling information is communicated).

The BSs contending for a COT in a shared frequency spectrum (e.g., in a subband) may perform an LBT in the shared frequency spectrum. The BS 105's ability to transmit a DL communication depends on whether the BS is able to gain access to the shared or unlicensed medium for transmission. If the LBT results in an LBT pass, the BS 105 may reserve the COT 202. The BS 105 may transmit during the COT 202, DCI 219 in the slot 204 indexed S0 (e.g., in a DL control portion of the slot 204). The DCI 219 may indicate a COT indicator 221 in the same slot 204 indexed S0. The COT indicator 221 may be addressed to multiple UEs and provide information regarding the structure of the COT 202. In an example, the COT indicator 221 indicates a subband configuration for the COT 202 (e.g., subband usage indication) and/or a duration of the COT 202 (e.g., a remaining COT duration). In an example, the DCI 219 may include a slot format indicator (SFI) (not shown) that includes the COT indicator 221. An SFI may indicate slot format information for the current slot and subsequent slots in the current COT. For example, the SFI informs the UE whether a slot is a DL, an UL, or a flexible slot and may indicate link direction over one or many slots through RRC signaling. Additionally, the SFI may denote whether a given symbol (e.g., OFDM symbol) in a slot is used for UL, DL, or flexible link direction in the current COT.

Additionally, the BS may transmit during the COT 202, DCI 220 in the slot indexed S1 (e.g., in a DL control portion of the slot 204). The DCI 220 may indicate a DL grant 223 in the same slot 204 indexed S1. Thus, the BS transmits a DL data signal 224 to the UE in the slot 204 indexed S1 (e.g., in a DL data portion of the slot 204). The UE may receive the DL data signal 224 via a scheduled DL grant in PDCCH via DCI 220. The UE may receive and decode the DCI 220 based on the DL grant 223. Additionally, the UE may receive the DL data signal 224 based on the DL grant. After receiving the DL data signal 224, the UE 115 may report a reception status of the DL data signal 224 to the BS by transmitting an ACK/NACK signal 228 (e.g., in an UL data portion or an UL control portion of a slot). The ACK/NACK signal 228 refers to a feedback signal carrying an ACK or a NACK. The UE may transmit an ACK when the reception of the DL data signal 224 is successful (e.g., received the DL data without error). Alternatively, the UE may transmit a NACK when the reception of the DL data signal 224 is unsuccessful (e.g., including an error or failing an error correction). The BS 105 may indicate the resource (e.g., slot) that may be used by the UE 115 for providing the feedback. The resource may be provided via a COT structure configuration and/or a control channel information detected by the UE 115

The ACK/NACK signal 228 may be associated with a hybrid automatic repeat request (HARQ) process. In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

During the COT 202, the BS further transmits DCI 222 in the slot 204 indexed S2 (e.g., in a DL control portion of the slot 204). The DCI 222 may indicate an UL grant for the UE. The UE may perform an LBT in the shared frequency spectrum (e.g., in a subband). If the LBT results in an LBT pass, the UE transmits an UL data signal 226 to the BS in the slot 204 indexed S6 (e.g., in a UL data portion of the slot 204) based on the UL assignment. The UE may transmit the UL data signal 226 via a scheduled UL (SUL) grant indicated in PDCCH via DCI 222.

It should be understood that the DCI 220 for the DL grant 223 and the DCI 219 for the COT indicator 221 can be in the same slot or different slots. Additionally, although the DL grant 223 for the DL data signal 224 indicated by the DCI 220 and the UL grant indicated by the DCI 222 are shown as being indicated by different DCIs, it should be understood that the aforementioned DL and UL grants may be in different DCI, but may be within the DL control channel of the same slot.

During the COT 202, the BS further transmits DCI 241 in the slot 204 indexed S7 (e.g., in a DL control portion of the slot 204). Additionally, the BS transmits DCI 230 in the slot 204 indexed S8 (e.g., in a DL control portion of the slot 204). The DCI 230 may indicate a DL grant for the UE in the same slot 204 indexed S8. Thus, the BS transmits a DL data signal 232 to the UE in the slot 204 indexed S8 (e.g., in a DL data portion of the slot 204). The DCI 241 may indicate a COT indicator 231 that provides an update of the structure of the COT 202 since transmission of the COT indicator 221, indicated by an arrow 240. In an example, the COT indicator 231 updates the previously provided COT information provided by the COT indicator 221.

In an example, the COT indicator 221, 231 may indicate a subband configuration for the COT 202. For example, the BS may attempt to communicate with the UE over a plurality of subbands. The BS may transmit the COT indicator 221, 231 indicating in which subbands of the plurality of subbands the BS was able to acquire a COT. The UE may also be provided with other forms of subband usage indications from the BS. The UE may use various techniques for determining subband usage by the BS in the plurality of subbands. A subband may be referred to as a valid subband if the UE determines that the BS is using the subband during the COT. A subband may be referred to as an invalid subband if the UE determines that the BS is not using the subband during the COT or if it is unknown whether the BS is using the subband during the COT. FIGS. 3-7 illustrate communication schemes and/or communication methods for communicating subband usage indications and communicating communication signals based on the subband configuration.

In another example, the BS transmits the COT indicator 221, 231 indicating a duration of the COT 202. The BS and UE may use various techniques for determining a COT duration and communicating communication signals based on the COT duration. FIGS. 8-11 illustrate communication schemes and/or communication method for communicating COT duration indications and communicating communication signals based on the indicated COT durations. The BS and/or the UE may use any of these techniques or combination of techniques as discussed in the present disclosure.

Figure 3:
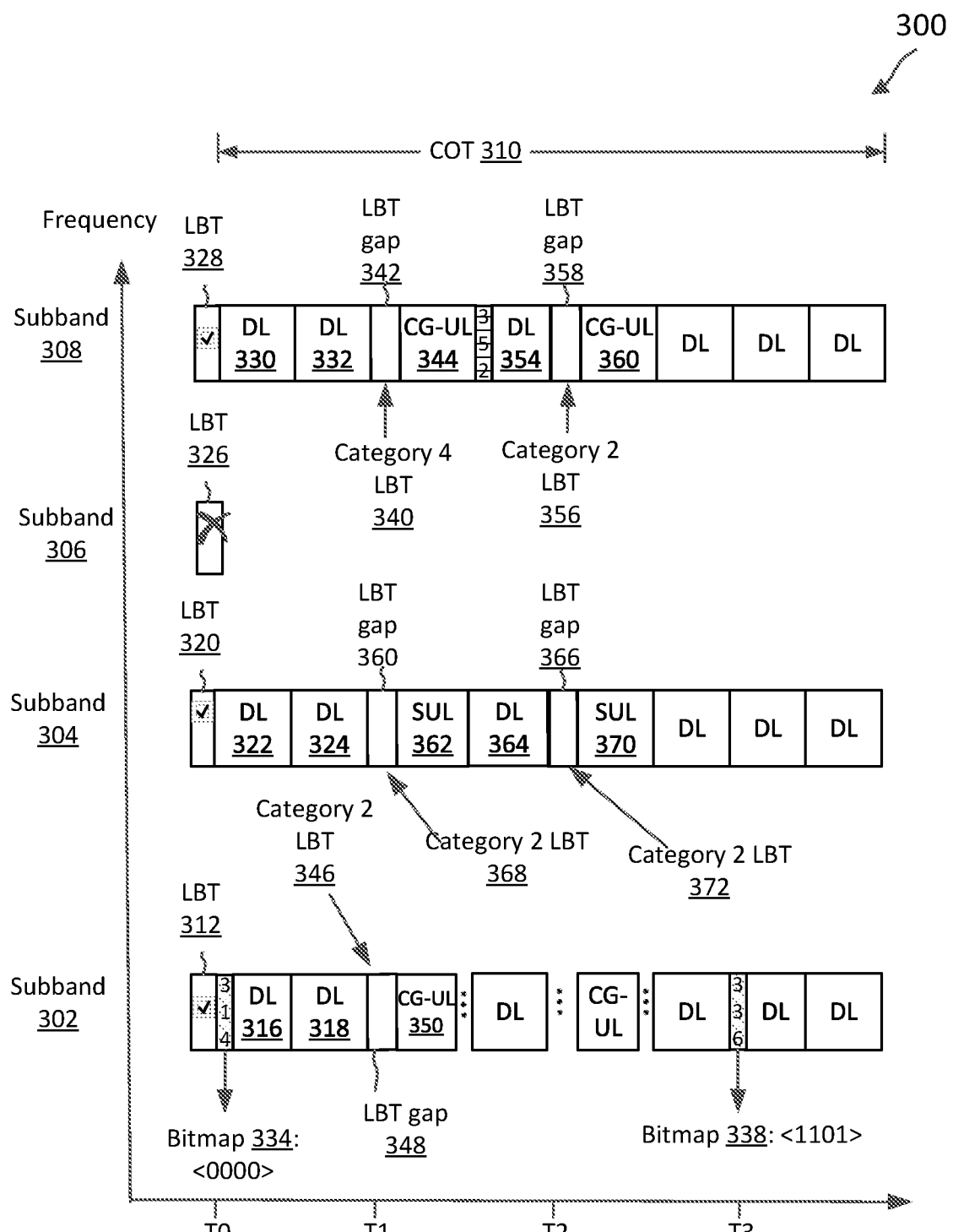
FIG. 3 illustrates a communication scheme for indicating a subband configuration for a COT according to some embodiments of the present disclosure.

FIG. 3 illustrates a communication scheme 300 for indicating a subband configuration (e.g., subband usage indication) for a COT according to some embodiments of the present disclosure. The communication scheme 300 may be employed by UEs such as the UEs 115 and/or BSs such as BSs 105 in a network such as the network 100. In FIG. 3, the x-axis represents time in some constant units, and the y-axis represents frequency in some constant units.

The UE may perform either a category 2 LBT or a category 4 LBT in a subband and may transmit an UL communication signal in the subband based on an LBT pass. The UE may determine, based on an indicated subband configuration for the COT, whether to perform the category 4 LBT or the category 2 LBT in the subband. By default, the UE 115 may perform a category 4 LBT for UL transmissions. The UE may perform a category 4 LBT in a subband if the UE determines that the subband is invalid. Conversely, the UE may perform a category 2 LBT in a subband if the UE determines that the subband is valid. The UE may determine that a subband is valid if the UE has received a COT indicator indicating usage of the subband by the BS and/or if the UE receives the COT indicator, PDCCH, PDSCH, or is scheduled with an UL transmission in the subband, or any combination of these. In some examples, the BS may transmit a UL scheduling DCI instructing the UE to perform either the category 2 LBT or the category 4 LBT. The UE may accordingly perform the instructed category 2 LBT or the category 4 LBT and transmit the UL transmission if the LBT passes.

The BS performs an LBT in a plurality of subbands including a subband 302, a subband 304, a subband 306, and a subband 308. The BS may perform an LBT on each subband of the plurality of subbands independently. As indicated by a checkmark in LBTs 312, 320, and 328, each of the LBTs 312, 320, and 328 results in an LBT pass and the BS reserves a COT 310 in the subbands 302, 304, and 308. As indicated by an "X" in the LBT 326, the LBT 326 results in an LBT fail.

As soon as the BS passes the LBT 312 in the subband 302, the BS may start DL transmissions. At time T0, the BS transmits to the UE, a COT indicator 314 indicating a subband configuration for the COT 310. The COT indicator 314 provides the UE with information regarding the BS's subband usage for the COT 310. The BS may also transmit DL data 316 and DL data 318 based on the LBT pass in the subband 302. Before the LBT 312 passes, the BS may encode a scheduling grant (e.g., a DL or an UL scheduling grant) and start preparing a DL data packet for transmission in the subband 302. The BS may prepare the payload for transmitting the COT indicator 314 before the LBT 312 passes in the subband 302. Accordingly, at the time the BS transmits the COT indicator 314, the COT indicator may not be an accurate depiction of the BS's subband usage (e.g., those subbands in which the BS was able to reserve a COT).

To mediate the "unknown" factor regarding the BS's subband usage, the BS may send the COT indicator 314 indicating that the BS's subband usage is unknown. The COT indicator 314 may indicate that the BS's subband usage is unknown via a reserved bitmap 334 storing all zeros (e.g., <0000>). In this example, a bitmap that does not store all zeros may indicate that the BS's subband usage is known and may further indicate an accurate subband usage by the BS. Each bit in the bitmap corresponds to a subband of the plurality of subbands. The first bit in the bitmap may correspond to the subband 302, the second bit in the bitmap may correspond to the subband 304, the third bit in the bitmap may correspond to the subband 306, and the fourth bit in the bitmap may correspond to the subband 308.

The BS's subband usage may be represented by a bitmap indicating which subbands are used by the BS in the current COT 310, unless the bitmap is a reserved bitmap (e.g., all zeros) indicating that the BS's subband usage is unknown. If the BS's subband usage is unknown, the subbands may be referred to as invalid subbands. The UE may determine, based on a subband usage indicator, whether a subband is valid or invalid. If the UE determines that the BS is using a subband (e.g., the BS was able to reserve a COT in the subband), the subband may be referred to as a valid subband. If the UE determines that the BS is not using a subband (e.g., the BS was unable to reserve a COT in the subband), the subband may be referred to as an invalid subband. In the example illustrated in FIG. 3, the UE may determine that a subband is valid if the corresponding bit in the bitmap is one and may determine that a subband is invalid if the corresponding bit in the bitmap is zero.

The UE determines, based on the COT indicator 314, that the BS's subband usage is unknown. After receiving the COT indicator 314, the UE expects a subsequent COT indicator within the COT 310, where the subsequent COT indicator indicates an update to the COT structure information provided by the COT indicator 314. It should be understood that any reserved value (other than all zeros as provided as an example in FIG. 3) may indicate that the BS's subband usage is unknown. Further, although a bitmap is described, any data structure (e.g., an array) may be used for storing values representing the BS's subband usage or that the BS's subband usage is unknown. Furthermore, it should be understood that in other examples, the UE may determine that a subband is valid if the corresponding bit in the bitmap is zero and may determine that a subband is invalid if the corresponding bit in the bitmap is one.

At time T3, the BS transmits a COT indicator 336 represented by a bitmap 338 <1101> indicating that the BS's subband usage is known and further indicating the BS's exact subband usage (based on the results from the LBTs 328, 326, 320, and 312). The bitmap 338 is different from the reserved bitmap 334 that indicates that the BS's subband usage is unknown (e.g., all zeros). Between time T0 and time T3, the BS's exact subband usage may be unknown by the UE because the UE has not yet received the COT indicator 336. In some examples, the UE may perform, based on a determination that the BS's subband usage is unknown, a category 2 LBT on each subband of the plurality of subbands 302, 304, 306, and 308. In this example, the UE may assume that it is outside of a COT acquired by the BS if the BS's subband usage is unknown and accordingly does not switching from the category 4 LBT to the category 2 LBT. The UE may determine whether to switch to the category 2 LBT after receiving the COT indicator 336. For example, the UE may determine, based on the COT indicator 336, whether a subband is being used or reserved by the BS. In this example, the UE may perform, based on a determination that the subband is valid (e.g., the subband is being used by the BS), a category 2 LBT in the subband. Additionally, the UE may perform, based on a determination that the subband is invalid (e.g., the subband is not being used or reserved by the BS), a category 4 LBT in the subband.

Before the UE receives the COT indicator 336 indicating the BS's exact subband usage, the UE may be provided with subband usage indicators indicating that a BS has acquired a COT in one or more subbands. For example, between time T0 and time T1, the BS's subband usage is unknown, and the BS may transmit the COT indicator 314, DL data 316, and DL data 318 based on the LBT pass in the subband 302. The UE may receive a subband usage indication that the subband 302 is valid based on receiving the COT indicator 314 or other PDCCH in the subband 302. In other words, the UE may determine that the subband 302 is valid based on receiving the COT indicator 314 and/or other PDCCH (e.g., DL data 316 or DL data 318) in the subband 302. In response to a determination that the subband 302 is valid, the UE may perform a category 2 LBT 346 during an LBT gap 348 in the subband 302. In this example, the UE may assume that the BS has reserved the COT 310 in the subband 302 and may accordingly perform a category 2 LBT in the valid subband. After the BS completes the DL transmission of DL data 316 and DL data 318, the BS may monitor for an UL transmission. The UE may perform an LBT during the LBT gap 348 due to the link switching from DL to UL. The LBT gap 348 may be located between an end of transmission of the DL data 318 and a start of a configured-grant UL (CG-UL) 350. The UE may transmit UCI and/or UL data via the CG-UL 350 based on a successful category 2 LBT 346.

A configured UL transmission is an unscheduled transmission, performed on the channel without an UL grant. A configured UL transmission may also be referred to as a grantless, grant-free, or autonomous transmission. In some examples, the UE may transmit an UL resource via a configured grant. Additionally, configured-UL data may also be referred to as grantless UL data, grant-free UL data, unscheduled UL data, or autonomous UL (AUL) data. Additionally, a configured grant may also be referred to as a grant-free grant, unscheduled grant, or autonomous grant. The resources and other parameters used by the UE for a configured grant transmission may be provided by the BS in an RRC configuration or an activation DCI, without an explicit grant for each UE transmission.

It may be difficult for the UE to determine in which subband(s) the PDCCH is received if the PDCCH is distributed over multiple subbands. For example, the BS may use PDCCH puncturing to mediate small gaps between obtaining the medium and transmission on the medium. Accordingly, it may be incorrect for the UE to assume that a BS reserved a COT in each subband in which a PDCCH is transmitted because the transmitter of the PDCCH may have used this puncturing technique for the transmission. The RRC configuration or DCI may indicate if the PDCCH uses puncturing. If PDCCH puncturing is enabled and if the PDCCH candidate spans multiple subbands, it is possible that receiving the PDCCH in a set of subbands does not translate into the set of subbands being valid. In this example, the UE may determine to not use the received PDCCH to determine that the set of subbands is valid. In this example, the UE does not perform category 2 LBT in the set of subbands if the PDCCH spans multiple subbands and the PDCCH uses puncturing. In some examples, the UE receives a PDCCH in a plurality of subbands and determines whether PDCCH puncturing is enabled. The UE may determine that at least one subband of the plurality of subbands (or the plurality of subbands) is valid in response to receiving the PDCCH in the plurality of subbands and in response to a determination that PDCCH puncturing is not enabled.

Between time T0 and time T1, the BS's subband usage is unknown. Additionally, the BS may transmit DL data 330 and DL data 332 based on the LBT pass in the subband 308. In some examples, the UE may continue to perform a category 4 LBT (and does not switch to performing a category 2 LBT) until the UE receives the COT indicator 336 indicating that the subband usage for the COT 310 by the BS is known and further indicating the BS's accurate subband usage. In response to a determination that the BS's subband usage is unknown, the UE performs a category 4 LBT 340 during an LBT gap 342 in the subband 308. After the BS completes the DL transmission of the DL data 330 and the DL data 332, the BS may monitor for an UL transmission. The UE may perform an LBT during the LBT gap 342 due to the link switching from DL to UL. The LBT gap 342 may be between an end of transmission of the DL data 332 and a start of a CG-UL 344. The UE may transmit UCI and/or UL data via the CG-UL 344 based on a successful category 4 LBT 340.

Between time T1 and time T2, the BS's subband usage is unknown. Additionally, the BS may transmit DCI indicating a DL grant 352 based on the LBT pass in the subband 308. The PDCCH may schedule the PDSCH for the same or different subband in which the PDCCH is transmitted. The UE may decode the PDCCH and receive the scheduled DL data 354 based on the DL grant 352. The UE may receive a subband usage indication that the subband 308 is valid based on receiving the DL grant 352 for PDSCH in the subband 308. In other words, the UE may determine that the subband 308 is valid based on receiving the DL grant 352 for a scheduled DL transmission in the subband 308. If the UE is scheduled for PDSCH in a subband, the UE may assume that the BS has reserved the COT 310 in the subband and may accordingly perform a category 2 LBT in the valid subband. In response to a determination that the subband 308 is valid, the UE may perform a category 2 LBT 356 during an LBT gap 358 in the subband 308. The UE may transmit UCI and/or UL data via a CG-UL 360 based on a successful category 2 LBT 356.

If the UE receives PDSCH that was punctured due to a subband LBT fail, the UE may incorrectly assume that the BS was able to reserve a COT in the subband. In an example, the BS may use PDSCH puncturing to mediate small gaps between obtaining the medium and transmission on the medium. Accordingly, it may be incorrect to assume that a BS reserved a COT in each subband in which a PDSCH for a DL grant is scheduled because the transmitter of the PDSCH may have used this puncturing technique for the scheduling. The RRC configuration or DCI may indicate if the PDSCH uses puncturing. If PDSCH puncturing is enabled, it is possible that receiving the PDSCH in a set of subbands does not translate into the set of subbands being valid. In this example, the UE may determine to not use the PDSCH scheduling information to determine that the set of subbands is valid. In this example, the UE does not perform category 2 LBT in the set of subbands if the PDSCH uses puncturing. In some examples, the UE receives a DL grant for a DL transmission in a plurality of subbands and determines whether PDSCH puncturing is enabled. The UE may determine that the plurality of subbands are valid in response to receiving the DL grant for the DL transmission in the plurality of subbands and in response to a determination that PDSCH puncturing is not enabled.

Additionally, the BS may schedule, based on the LBT pass in the subband 304, an UL transmission for the UE. The PDCCH may schedule the PUCCH and/or the PUSCH for the same or different subband in which the PDCCH is transmitted. The UE may decode the PDCCH and receive the UL grant indicating that the UE is scheduled for an UL transmission (e.g., PUSCH or PUCCH) in the subband 304. The UE may receive a subband usage indication that the subband 304 is valid based on receiving the UL grant for the UL transmission in the subband 304. In some examples, the UE may determine that the subband 304 is valid based on being scheduled with a SUL 362 for the subband 304. If the UE is scheduled with the SUL 362 for the subband 304, the UE may assume that the BS has reserved the COT 310 in the subband and may accordingly perform a category 2 LBT in the valid subband. In response to a determination that the subband 304 is valid, the UE may perform a category 2 LBT 368 during an LBT gap 360 in the subband 304. The UE may transmit UCI and/or UL data via the SUL 362 based on a successful category 2 LBT 368.

Additionally, the UE may perform, based on the SUL 362 and/or a SUL 370 for the subband 304, a category 2 LBT 372 during an LBT gap 366. The UE may transmit UCI and/or UL data via the SUL 370 based on a successful category 2 LBT 372. It may be unlikely for the UE to receive an UL grant with a category 2 LBT at the start of the COT 310 because the BS may not have subband LBT status at that point. For example, to transmit the DCI indicating an UL grant, the BS prepares the PDCCH. In some examples, the UE is scheduled for an UL transmission for a plurality of subbands and may transmit an UL transmission (e.g., PUCCH or PUSCH) only if all the subbands of the plurality are available for the UE to use for the UL transmission (e.g., the UE is able to reserve a COT in each of the subbands of the plurality). Accordingly, it may be incorrect to assume that receiving an UL grant for an UL transmission in the subband 304 translates into the BS reserving a COT for all scheduled subbands with a SUL. In this example, the UE may determine to not use the UL scheduling information to determine the BS's subband usage or whether a subband is valid.

The BS may transmit multiple COT indicators inside the COT 310 and provide the UE with updated information regarding the BS's subband usage for the COT 310. For example, the COT indicator 314 may be a tentative indication to provide the BS with more time to prepare a more accurate depiction of the BS's subband usage. As time progresses, the BS may pass the LBT 320 in the subband 304 and update the bit corresponding to the subband 304 in the bitmap 334 to a value of one. If the bitmap is different from the reserved bitmap, the bitmap may be an updated bitmap that indicates the BS's current subband usage.

A COT indicator is indicated within the COT 310 multiple times. For example, at time T3, the UE receives the COT indicator 336 represented by the bitmap 338 "<1101>" in the subband 302. The COT indicator 336 may indicate the BS's "exact subband usage" or "accurate subband usage" and may "override" the previous BS's subband usage indicated by COT indicator 314. The bitmap 338 indicates that the BS's subband usage is known and the BS's exact subband usage. The bitmap 338 indicates that during the COT 310, the BS is using the subband 302 (first bit of the bitmap 338 is one), the subband 304 (second bit of the bitmap 338 is one), and the subband 308 (fourth bit of the bitmap 338 is one), but not using the subband 304 (third bit of the bitmap 338 is zero). Accordingly, the UE determines, based on receiving the COT indicator 336, that subbands 302, 304, and 308 are valid and that subband 306 is invalid. The UE may perform a category 2 LBT on valid subbands and perform a category 4 LBT on invalid subbands. In response to a determination that the subbands 302, 304, and 308 are valid based on the COT indicator 336, the UE may perform a category 2 LBT in the valid subbands 302, 304, and/or 308 before transmitting an UL communication signal. Additionally, the UE may perform a category 4 LBT in the invalid subband 306 before transmitting an UL communication signal.

The COT indicator 336 may also be referred to as "an exact subband usage indication" or "an accurate subband usage indication." In some examples the UE may determine that the BS's subband usage is known only in response to receiving the COT indicator 336. In an example, the UE may determine that the subbands 302, 304, 306, and 308 are invalid based on the COT indicator 314 and determine that a subband is valid only based on an indication by a subsequent COT indicator (e.g., COT 338). In this example, the UE may ignore the above subband usage indications.

The COT indicator 314 is the first COT indicator transmitted by the BS, and the COT indicator 336 is the next COT indicator transmitted by the BS after the first COT indicator. The UE may maintain a bitmap (or other data structure) that stores an indication of the BS's subband usage. In an example, the UE receives the COT indicator 314 may continue to incrementally update the BS's subband usage based on one or more of the subband usage indicators discussed in the present disclosure and/or the subsequent COT indicators (e.g., COT indicator 336). For example, the UE may store the bitmap 334 and incrementally update it based on the one or more of the subband usage indicators. When the UE receives the COT indicator 336, the UE may store the bitmap 338 as indicating the BS's accurate or exact subband usage. In another example, the UE stores the bitmap 334 and only updates the subband usage information based on receiving subsequent COT indicators (e.g., COT indicator 336). In this example, the UE ignores the above subband usage indications for maintaining and determining the BS's subband usage.

To receive messages from the BS 105, the UE 115 may perform DL control channel monitoring. The BS 105 may configure the UE 115 with one or more CORESETs in one or more subbands. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DCI information from the BS. In an example, the BS 105 may configure the UE 115 with the subbands, the CORESETS, and/or the PDCCH search spaces via RRC configurations. The UE may use various techniques for receiving DL control messages via PDCCH based on the subband configuration for the COT 310. The UE may use any of these techniques or combination of techniques as discussed in the present disclosure.

The BS 105 may configure a UE 115 with multiple PDCCH monitoring configurations. Each configuration may include a group of search spaces (e.g., PDCCH monitoring occasions) for DL control channel monitoring. The PDCCH monitoring configurations may provide different time and/or frequency monitoring patterns. Each group or each configuration may include a different set of search spaces. In an example, the BS 105 may configure the UE 115 with multiple groups or configurations of PDCCH search spaces for PDCCH monitoring. The different groups of PDCCH search spaces may provide different monitoring periodicities, for example, at a slot boundary for a slower frequency monitoring or at a mini-slot boundary for more frequent monitoring. Additionally, the BS may configure the UE with triggering conditions for switching among the groups. The triggering conditions can include, for example, an indication that the BS's subband usage is known or unknown. The switching between the first and second search groups based on the subband configuration for the COT (e.g., whether the BS's subband usage is known or unknown) provides opportunities for the UE to save power when frequent monitoring may not be needed (e.g., the UE knows in which subbands the BS has acquired a COT).

The BS may instruct the UE to switch the DL control channel monitoring configuration based on various triggers. For example, the BS may configure the UE to use a first search space group with a more frequent monitoring pattern (e.g., at intervals of about 2 symbols or about 3 symbols) if the BS's subband usage is unknown. In an example, the UE may receive the COT indicator 314 and may accordingly monitor PDCCH on all subbands of the plurality of subbands 302, 304, 306, and 308. While the BS's subband usage is unknown, the UE may assume that the BS has not yet acquired a COT, which may be reserved in any of the subbands and start at a symbol in the middle of a slot. The UE accordingly monitors all of the subbands for DCI.

The BS may configure the UE to switch from the first search space group to a second search space group with a slower frequency monitoring pattern upon a detection of one or more valid subbands. The second search space group may include the valid subbands (e.g., subbands that have been indicated as being valid based on receiving PDCCH, PDSCH, and/or a scheduled UL transmission in the subbands or based on receiving an accurate subband usage from the BS via transmission of a second COT indicator). If the BS's subband usage is known, the UE may assume that the BS has acquired a COT in the subbands and accordingly may monitor at a slower pace because the PDCCH may be transmitted, for example, once per slot. The second search space group may be a subset of and include fewer subbands than the first search space group.

In some examples, the UE may detect the valid subband in response to receiving a subband usage indication for the subband. The UE may receive a subband usage indication for a subband if the UE receives a COT indicator or other PDCCH in the subband (e.g., receiving the COT indicator 314 in the subband 302), is scheduled with PDSCH in the subband (e.g., receiving the DL grant 352 that schedules transmission of the DL data 354 in the subband 308), and/or is scheduled with an UL transmission in the subband (e.g., receiving the UL grant that schedules transmission of the UL data via the SUL 362 in the subband 304). In an example referring to FIG. 3, the UE detects the valid subband only upon receiving the COT indicator 336. In this example, the UE continues to use the first search space group with a more frequent monitoring pattern until it receives the "accurate subband usage" from the BS via the COT indicator 336.

In some examples, the BS transmits a switching bit in the COT indicator to indicate to the UE whether to switch the DL control channel monitoring configuration. In an example, if the switching bit has a first value ("0"), the UE may determine to continue using the current search space group (e.g., the first search space group) and accordingly not switch to another search space group (e.g., the second search space group). If the switching bit has a second value ("1") different from the first value, the UE may determine to switch to another search space group different from the current search space group. In some examples, the BS instructs the UE to use the first search space group with a more frequent monitoring pattern based on receiving the COT indicator 314 and further to switch to the second search space group upon receiving the accurate subband usage in the next COT indicator 336 after the COT indicator 314.

In some examples, the BS may transmit a periodic-CSI-RS (P-CSI-RS) in one or more subbands of the plurality of subbands 302, 304, 306, and 308. The UE may receive the P-CSI-RS in a subband, process the P-CSI-RS, and transmit a CSI report based on the P-CSI-RS to the BS. The CSI report may include channel quality information (CQI), preceding matrix indicator (PMI), CRI (CRS-RS resource indicator), SS/PBCH resource block indicator (SSBRI), link indicator (LI), and/or rank indicator (RI), and/or L1-RSRP.

Figure 4:
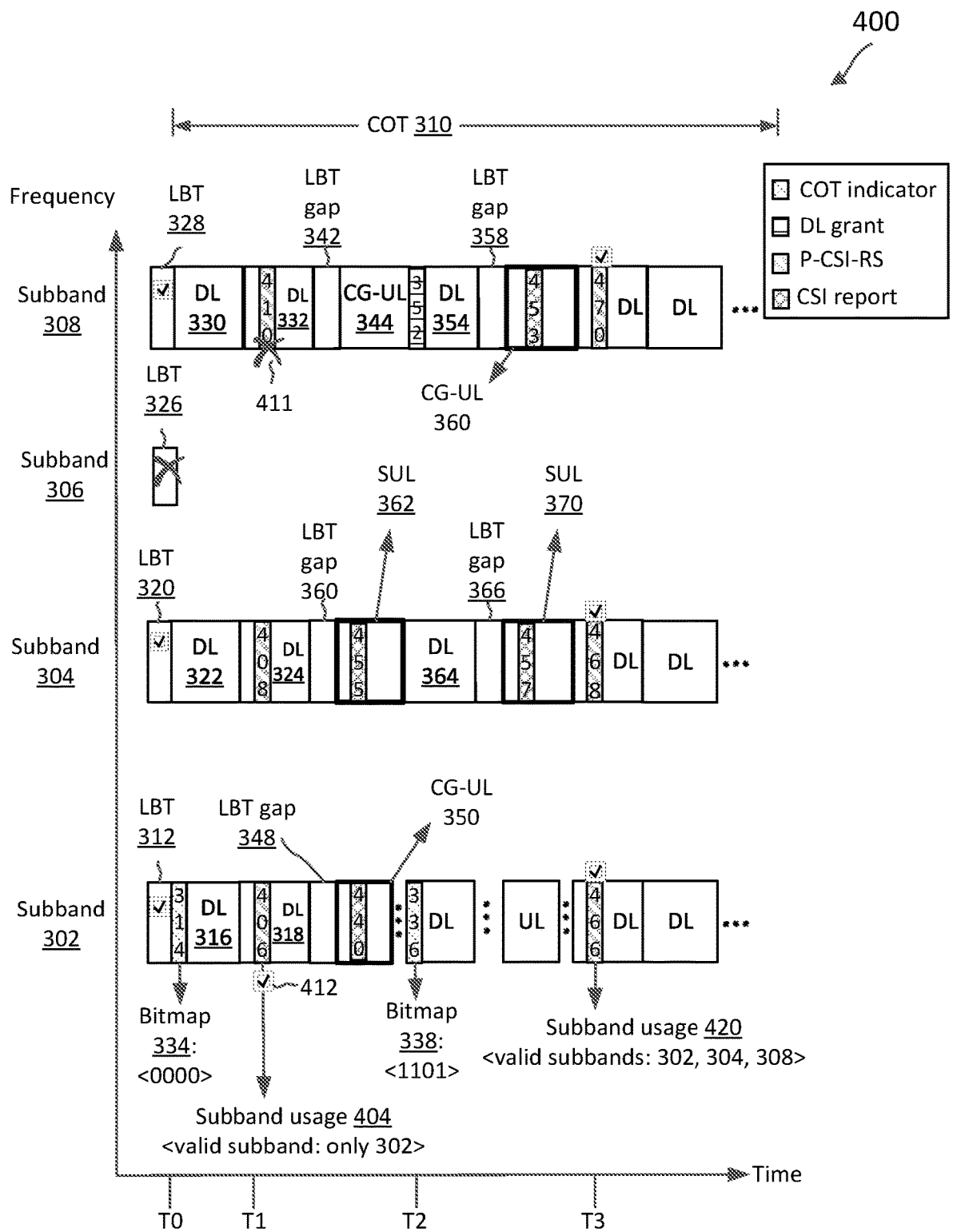
FIG. 4 illustrates a communication scheme for indicating a subband configuration for a COT according to some embodiments of the present disclosure.

FIG. 4 illustrates a communication scheme 400 for indicating a subband configuration (e.g., subband usage indication) for a COT according to some embodiments of the present disclosure. The communication scheme 400 may be employed by UEs such as the UEs 115 and/or BSs such as BSs 105 in a network such as the network 100. In FIG. 4, the x-axis represents time in some constant units, and the y-axis represents frequency in some constant units. The plurality of subbands 302, 304, 206, and 308 and the COT indicators 314 and 336 were discussed above in relation to FIG. 3.

In FIG. 4, at time T0, the UE receives the COT indicator 314 indicating that the BS's subband usage is unknown. At time T2, the UE receives the COT indicator 336 in the subband 302. At time T1, which is between time T0 and time T2, the UE receives a P-CSI-RS 406 in the subband 302, a P-CSI-RS 408 in the subband 304, and a P-CSI-RS 410 in the subband 308. In some examples, the UE may determine whether a subband in which a P-CSI-RS was transmitted is valid. The UE may determine that a P-CSI-RS transmitted in a valid subband is valid and further determine that a P-CSI-RS transmitted in an invalid subband is invalid. The UE may receive and process P-CSI-RSs transmitted in valid subbands and ignore (not process) P-CSI-RSs transmitted in invalid subbands.

The UE may utilize the subband usage indications discussed in relation to FIG. 3 to determine whether a subband in which a P-CSI-RS is transmitted is valid. In an example, after receiving the COT indicator 314, the UE may determine that all subbands are invalid until the UE receives the COT indicator 336. In this example, the UE may determine, based on the subbands 302, 304, and 308 being invalid, that the P-CSI-RS 406, the P-CSI-RS 408, and the P-CSI-RS 410 are also invalid and accordingly does not process the P-CSI-RS 406, the P-CSI-RS 408, or the P-CSI-RS 410. Accordingly, the UE does not transmit a CSI report based on the invalid P-CSI-RSs 406, 408, and 410 to the BS.

In some examples, the UE may determine that a subband is valid based on a subband usage indication. As discussed above, the UE may receive a subband usage indication that the subband 302 is valid based on receiving the COT indicator 314 or other PDCCH (e.g., DL data 316) in the subband 302. The UE may maintain a subband usage 404 indicating that only the subband 302 is valid. In response to a determination that the subband 302 is valid, the UE may determine that the P-CSI-RS 406 is valid and may accordingly process the P-CSI-RS 406. After the BS completes the DL transmission of the DL data 316, the BS may monitor for an UL transmission. The UE may transmit, based on the valid P-CSI-RS 406, a CSI report 440 for the subband 302 via the CG-UL 350 in the subband 302 to the BS. Alternatively, the UE may transmit, based on the valid P-CSI-RS 406, a CSI report 440 for the subband 302 via an SUL. Additionally, in an example, the UE may determine to not use the received PDCCH to determine that a subband is valid if PDCCH puncturing is enabled and the PDCCH candidate spans multiple subbands.

As discussed, the UE may determine, based on the COT indicator 314, that the BS's subband usage is unknown. The UE may determine, based on the BS's subband usage being unknown, that the subband 308 is invalid. In response to a determination that the subband 308 is invalid, the UE determines that the P-CSI-RS 410 is also invalid, shown by an "X" mark 411. The UE may continue to ignore P-CSI-RSs in the subband 308 until the UE receives the COT indicator 336 indicating that the subband usage for the COT 310 by the BS is known and further indicating the BS's accurate subband usage. The processing of the COT indicator 336 is further discussed below.

Additionally, as discussed, the UE may receive a subband usage indication that the subband 308 is valid based on receiving a scheduled PDSCH for the subband 308. In an example, the UE receives DCI indicating the DL grant 352 for a scheduled DL transmission of the DL data 354. In response to a determination that the subband 308 is valid, the UE may determine that subsequent P-CSI-RSs received in the subband 308 are valid and accordingly may process these P-CSI-RSs. The UE may transmit, based on a processed P-CSI-RS received in the subband 308, a CSI report 453 via the CG-UL 360. Additionally, in an example, the UE may determine to not use the received PDSCH scheduling information to determine that a subband is valid if PDSCH puncturing is enabled.

As discussed, the UE may receive a subband usage indication that the subband 304 is valid based on receiving an UL grant indicating the SUL 362 in the subband 304. In response to a determination that the subband 304 is valid, the UE may determine that subsequent P-CSI-RSs received in the subband 304 are valid and accordingly process these P-CSI-RSs. The UE may transmit, based on a processed P-CSI-RS, a CSI report 455 via the SUL 362. Additionally, the UE may transmit, based on a processed P-CSI-RS received in the subband 304, a CSI report 457 via the SUL 370. In an example, the UE may determine to not use the scheduled UL transmission for a subband to determine the BS's subband usage or whether the subband is valid.

At time T2, the UE receives the COT indicator 336 represented by the bitmap 338 "<1101>" indicating that the BS's accurate subband usage includes subbands 302, 304, and 308. Accordingly, the UE determines, based on receiving the COT indicator 336, that subbands 302, 304, and 308 are valid and that subband 306 is invalid. The UE may maintain an updated subband usage 420 indicating that the subbands 302, 304, and 308 are valid.

At time T3, the UE receives a P-CSI-RS 466 in the subband 302, a P-CSI-RS 468 in the subband 304, and a P-CSI-RS 470 in the subband 308. The UE may determine that each of the P-CSI-RSs 466, 468, and 470 is valid, as indicated by a checkmark shown above the respective P-CSI-RSs. The UE may process the P-CSI-RS 466 and transmit, based on the processed P-CSI-RS 466 received in the valid subband 302, a CSI report (not shown) to the BS. Additionally, the UE may process the P-CSI-RS 468 and transmit, based on the P-CSI-RS 468 received in the valid subband 304, a CSI report (not shown) to the BS. Additionally, the UE may process the P-CSI-RS 470 and transmit, based on the P-CSI-RS 470 received in the valid subband 308, a CSI report (not shown) to the BS.

In some examples, the UE may use subband-based factors other than the subband usage information. For example, the UE may determine whether a subband is valid based on factors such as signal-to-noise ratio (SNR), delay spread of channel estimate, etc., with or without taking into consideration the subband usage information. In this example, the UE may attempt to process each of the P-CSI-RSs and determine whether the one or more SNRs are above a threshold. The UE may determine that the subbands associated with an SNR above the threshold are valid and used by the BS.

It should be understood that after time T3, the BS may transmit another COT indicator indicating the BS's actual subband usage and/or one or more subband usage indications, as discussed in the present disclosure. For example, the BS may transmit a third COT indicator after the COT indicator 366, where the third COT indicator updates the subband configuration information previously indicated by the COT indicator 366. Additionally, the UE may update the bitmap 338 based on the subsequent subband usage indications and/or the third COT indicator.

Figure 5:
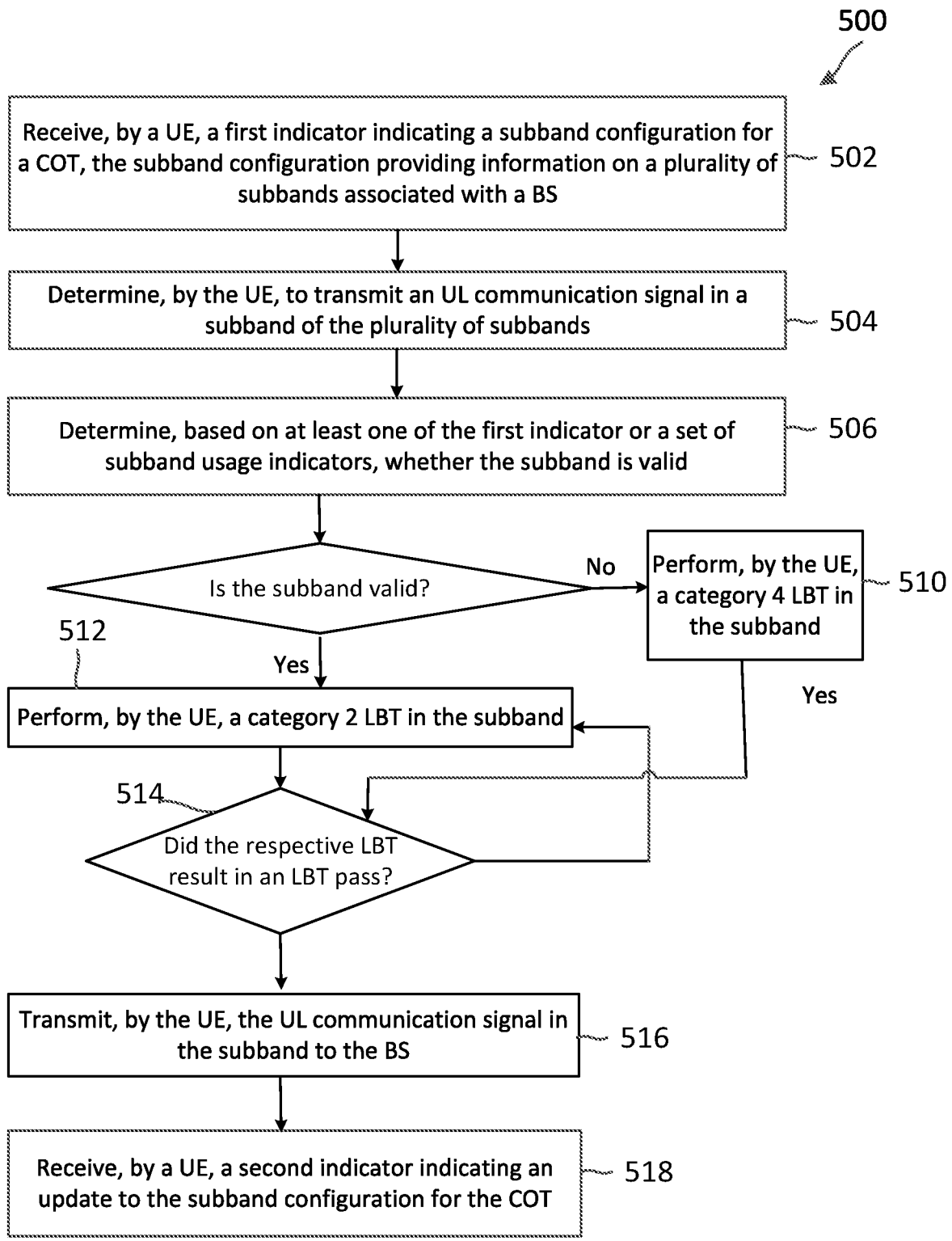
FIG. 5 is a flow diagram of a communication method for communicating an uplink (UL) communication signal based on a subband configuration for a COT according to some embodiments of the present disclosure.

FIG. 5 is a flow diagram of a communication method 500 for communicating an UL communication signal based on a subband configuration for a COT according to some embodiments of the present disclosure. Steps of the method 500 can be executed by a computing device (e.g., a processor, processing circuit, and/or other suitable component) of a wireless communication device or other suitable means for performing the steps. For example, a wireless communication device, such as the UE 115, may utilize one or more components, such as a processor, a memory, a subband indication module, a signaling module, a transceiver, a modem, and the one or more antennas, to execute the steps of method 500 (see FIG. 13). The method 500 may employ similar mechanisms as in the communication scheme 200, the communication scheme 300, and/or the communication scheme 400 described above with respect to FIGS. 2, 3, and/or 4, respectively. As illustrated, the method 500 includes a number of enumerated steps, but embodiments of the method 500 may include additional steps before, after, and in between the enumerated steps. In some embodiments, one or more of the enumerated steps may be omitted or performed in a different order.

At step 502, the method 500 includes receiving, by the UE, a first indicator indicating a subband configuration for a COT, the subband configuration providing information on a plurality of subbands associated with a BS. The BS may transmit the first indicator to the UE, and the subband configuration for the COT may provide information on the BS's subband usage. In an example, the first indicator is a COT indicator indicating that the BS's subband usage is unknown in the COT. In this example, the UE receives the first indicator and determines that the BS's subband usage is unknown. In another example, the first indicator may indicate the BS's actual usage (e.g., 336) in the COT. In this example, the BS may have transmitted a previous COT indicator preceding the first COT indicator. In this example, the UE receives the first COT indicator and determines that the BS's subband usage is known and further determines the subbands used in the COT by the BS. In another example, the first indicator is a subband usage indicator as discussed in the present disclosure.

At step 504, the method 500 includes determining, by the UE, to transmit an UL communication signal in a subband of the plurality of subbands. At step 506, the method 500 includes determining, based on at least one of the first indicator or a set of subband usage indicators, whether the subband is valid. In an example, if the UE determines that the BS's subband usage is unknown, the UE may determine that the subband is invalid. In another example, the UE may determine that a subband is valid if the UE has received a COT indicator indicating usage of the subband by the BS and/or if the UE receives the COT indicator, PDCCH, PDSCH, is scheduled with an UL transmission in the subband, or any combination of these. In another example, the first COT indicator may indicate a set of zero or more valid subbands (e.g., subbands in which the BS was able to acquire a COT) and/or a set of zero or more invalid subbands (e.g., subbands in which the BS was unable to acquire a COT).

If the subband is not valid (or invalid), process flow may proceed to step 510, in which the UE performs a category 4 LBT in the subband. If the subband is valid, process flow proceeds to step 512, in which the UE performs a category 2 LBT in the subband.

At step 514, the method 500 includes determining whether the respective LBT results in an LBT pass. If the respective LBT does not result in an LBT pass, process flow may proceed back to step 512, in which the UE performs another category 2 LBT in the subband. If the respective LBT results in an LBT pass, process flow may proceed back to step 516, in which the UE transmits the UL communication signal in the subband to the BS. For example, the UE may transmit PUCCH or PUSCH based on the LBT pass. The BS may receive the UL communication signal.

At step 518, the method 500 includes receiving, by the UE, a second indicator indicating an update to the subband configuration for the COT. The BS may transmit the second indicator.

Figure 6:
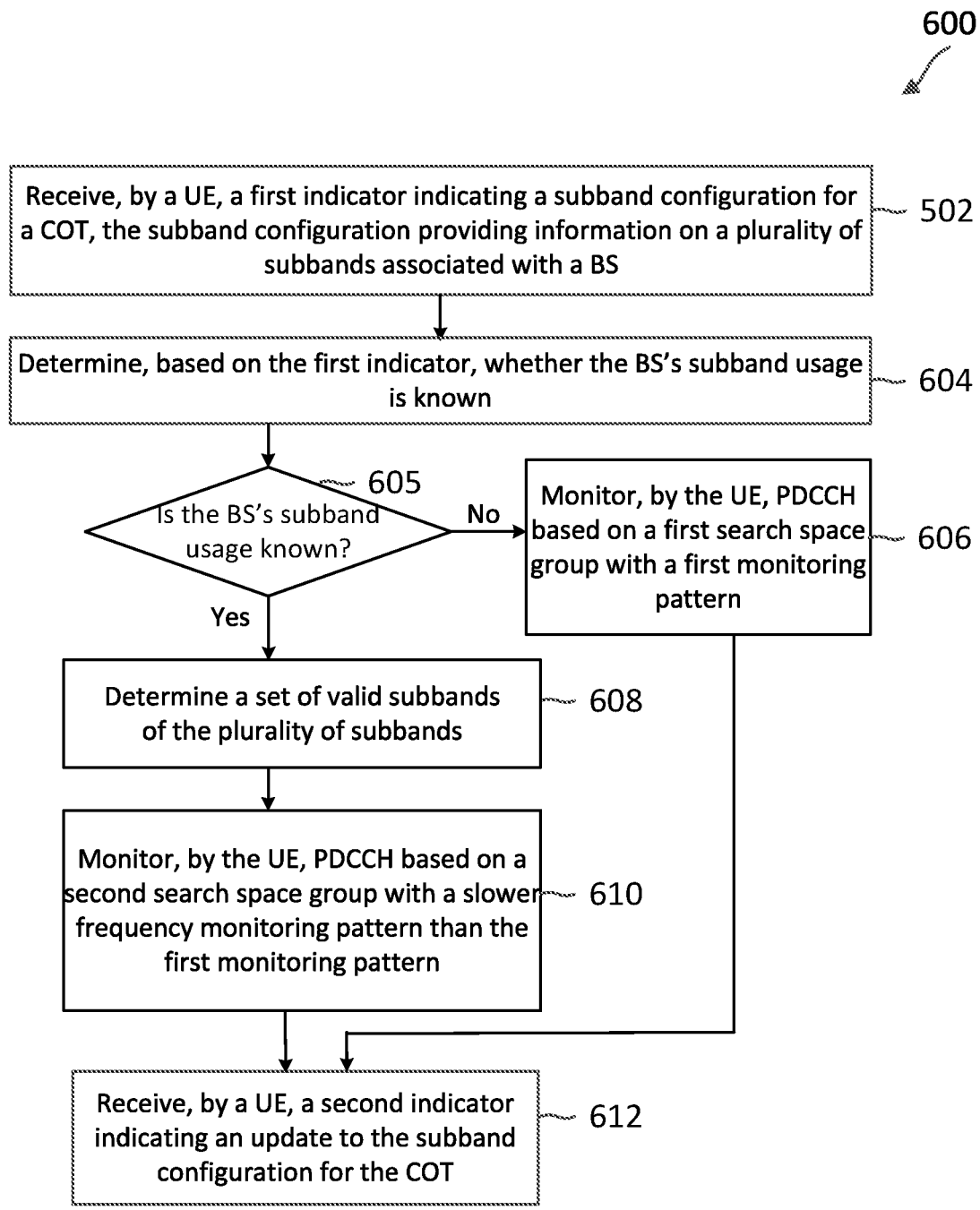
FIG. 6 is a flow diagram of a communication method for monitoring physical downlink control channel (PDCCH) based on a subband configuration for a COT according to some embodiments of the present disclosure.

FIG. 6 is a flow diagram of a communication method 600 for monitoring PDCCH based on a subband configuration for a COT according to some embodiments of the present disclosure. Steps of the method 600 can be executed by a computing device (e.g., a processor, processing circuit, and/or other suitable component) of a wireless communication device or other suitable means for performing the steps. For example, a wireless communication device, such as the UE 115, may utilize one or more components, such as a processor, a memory, a subband indication module, a signaling module, a transceiver, a modem, and the one or more antennas, to execute the steps of method 600 (see FIG. 13). The method 600 may employ similar mechanisms as in the communication scheme 200, the communication scheme 300, and/or the communication scheme 400 described above with respect to FIGS. 2, 3, and/or 4, respectively. As illustrated, the method 600 includes a number of enumerated steps, but embodiments of the method 600 may include additional steps before, after, and in between the enumerated steps. In some embodiments, one or more of the enumerated steps may be omitted or performed in a different order.

The method 600 includes step 502, which was discussed in relation to FIG. 5. At step 604, the method 600 includes determining, based on the first indicator, whether the BS's subband usage is known. If the BS's subband usage is unknown, process flow may proceed to step 606, in which the UE monitors PDCCH based on a first search space group with a first monitoring pattern. In an example, the first search space group includes the plurality of subbands and the first monitoring pattern includes monitoring PDCCH at intervals of about 2 symbols or about 3 symbols. The BS may configure the UE to monitor PDCCH based on the first search space group. After step 606, process flow may proceed to step 612, in which the UE receives the second indicator indicating an update to the subband configuration for the COT.

If the BS's subband usage is known, process flow may proceed to step 608, in which the UE determines a set of valid subbands of the plurality of subbands. At step 610, the method 600 includes monitoring, by the UE, PDCCH based on a second search space group with a slower frequency monitoring pattern than the first monitoring pattern. In an example, the second search space group may include the valid subbands (e.g., subbands that have been indicated as being valid based on receiving PDCCH, PDSCH, and/or a scheduled UL transmission in the subbands or based on receiving an accurate subband usage from the BS via transmission of a second COT indicator), and the UE monitors the PDCCH one per slot based on the slower frequency monitoring pattern. The BS may configure the UE to monitor PDCCH based on the second search space group with a slower frequency monitoring pattern than the first monitoring pattern.

At step 612, the method 600 includes receiving, by the UE, a second indicator indicating an update to the subband configuration for the COT. The BS may transmit the second indicator.

Figure 7:
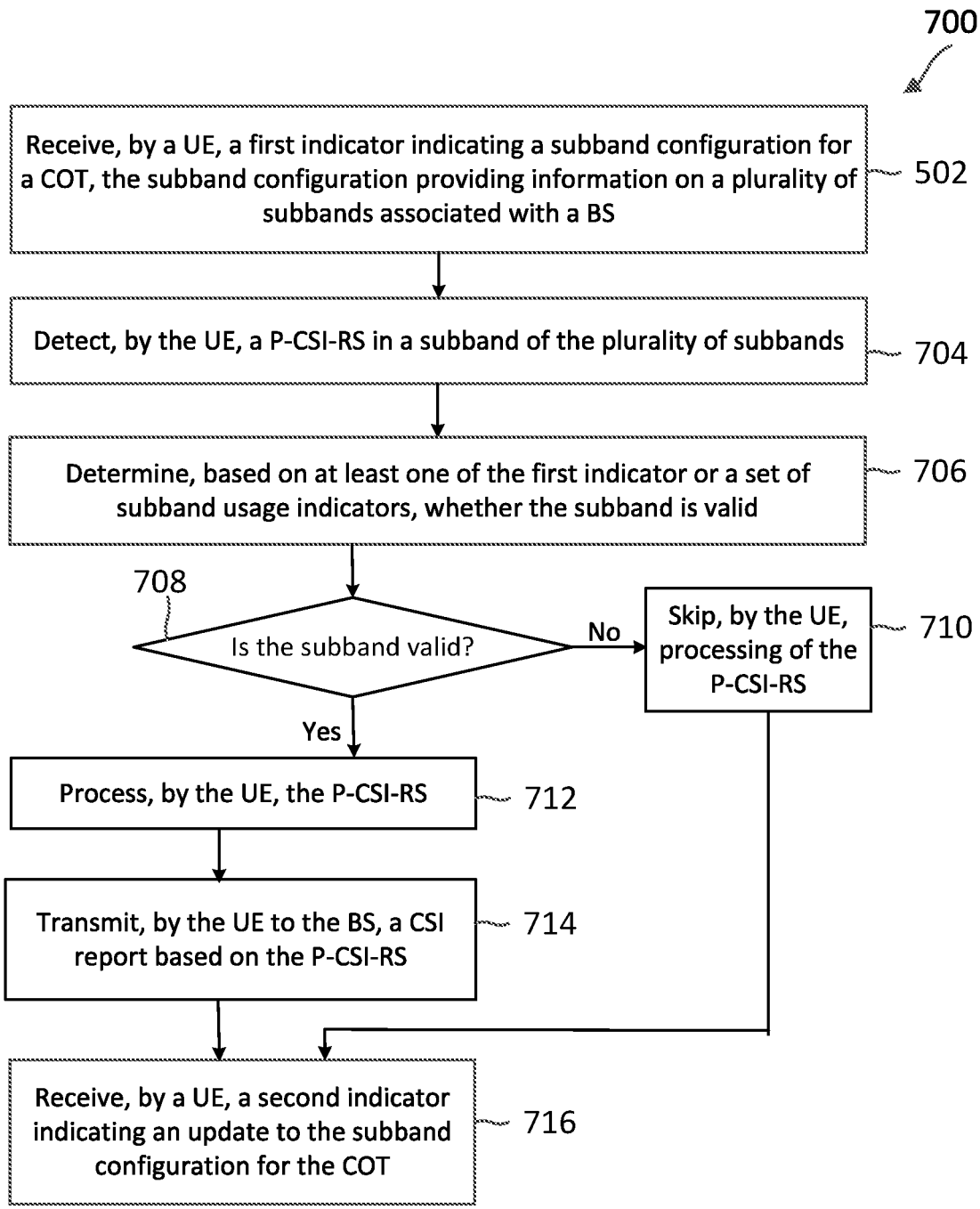
FIG. 7 is a flow diagram of a communication method for processing a periodic-channel state information-reference signal (P-CSI-RS) based on a subband configuration for a COT according to some embodiments of the present disclosure.

FIG. 7 is a flow diagram of a communication method 700 for processing a P-CSI-RS based on a subband configuration for a COT according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115, may utilize one or more components, such as a processor, a memory, a subband indication module, a signaling module, a transceiver, a modem, and the one or more antennas, to execute the steps of method 700 (see FIG. 13). The method 700 may employ similar mechanisms as in the communication scheme 200, the communication scheme 300, and/or the communication scheme 400 described above with respect to FIGS. 2, 3, and/or 4, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

The method 700 includes step 502, which was discussed in relation to FIG. 5. At step 704, the method 700 includes detecting, by the UE, a P-CSI-RS in a subband of the plurality of subbands. The BS may transmit the P-CSI-RS to the UE in the subband. At step 706, the method 700 includes determining, based on at least one of the first indicator or a set of subband usage indicators, whether the subband is valid.

If the subband is not valid (or invalid), process flow may proceed to step 710, in which the UE skips processing of the P-CSI-RS. In an example, the UE ignores the P-CSI-RS and does not process it. In this example, the UE determines to not transmit a CSI report in the invalid subband and accordingly does not do so. After step 710, process flow may proceed to step 716, in which the UE receives a second indicator indicating an update to the subband configuration for the COT.

If the subband is valid, process flow may proceed to step 712, in which the UE processes the P-CSI-RS. At step 714, the method 700 includes transmitting, by the UE to the BS, a CSI report based on the P-CSI-RS. The BS may receive the CSI report from the UE. At step 716, the method 700 includes receiving, by the UE, a second indicator indicating an update to the subband configuration for the COT. The BS may transmit the second indicator. The update for the subband configuration for the COT may provide updated information on the BS's subband usage. In an example, the second indicator may be a COT indicator that updates the subband configuration information indicated by the first COT indicator. In another example, the second indicator is a subband usage indicator as discussed in the present disclosure.

In some examples, the BS transmits a COT indicator indicating a duration of a COT. A COT indicator that indicates the remaining COT duration may also be referred to as a COT duration indicator. If the COT has a long duration, the number of bits used to indicate the long COT duration may be large. The present disclosure provides a compromise between indicating a long COT duration versus granularity of the indication. In some examples, the BS provides an "incremental" indication of the COT duration.

The UE may use any suitable combination of the methods 500, 600, 700 to determine whether to switch between category 2 LBT and category 4 LBT, to report P-CSI-RS, or to switch PDCCH monitoring configurations.

Figure 8:
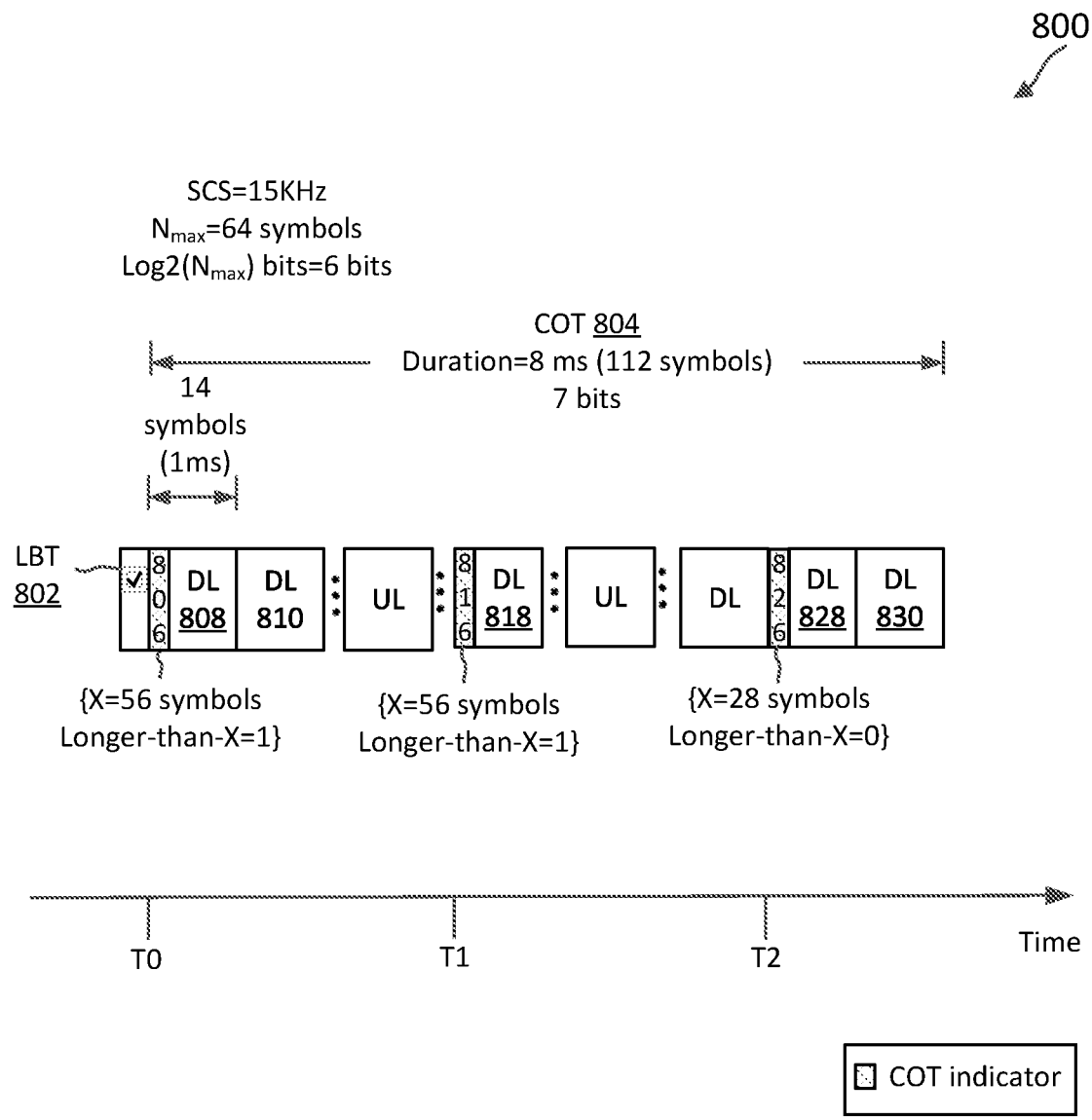
FIG. 8 illustrates a communication scheme for indicating a duration of a COT according to some embodiments of the present disclosure.

FIG. 8 illustrates a communication scheme 800 for indicating a duration of a COT according to some embodiments of the present disclosure. The communication scheme 800 may be employed by UEs such as the UEs 115 and/or BSs such as BSs 105 in a network such as the network 100. In FIG. 8, the x-axis represents time in some constant units.

In the example illustrated in FIG. 8, the subcarrier spacing may occur with 15 kHz, $N_{max}$ is 64 symbols, and 6 bits are used to represent 64. Additionally, one slot is 14 symbols, and the COT duration is 112 symbols or 8 ms. Before Time T0, the BS may perform an LBT 802 in a subband. As indicated by a checkmark in the LBT 802, the LBT 802 results in an LBT pass and the BS reserves a COT 804 in the subband. At Time T0, the BS transmits a COT indicator 806 indicating a remaining duration X of the COT 804 and a Longer-than-X flag. The BS may also transmit DL data 808 and DL data 810 based on the LBT pass.

The duration of the COT 804 may be indicated in a number of symbols, in ms, in slots, or any other format (e.g. X symbols, X ms, X slots, etc.). In some examples, the COT indicator may indicate X symbols as the remaining COT duration. In an example, Nm represents the maximum COT duration (e.g., in symbols) representable with the available number of bits. The COT indicator may also include a "Longer-than-X" flag to indicate whether the X symbols indicated is the full remaining COT duration or a lower bound for the full remaining COT duration. If the Longer-than-X flag is set to zero in a COT indicator, the COT indicator indicates the full remaining COT duration. If the Longer-than-X flag is set to one in a COT indicator, the COT indicator does not indicate the full remaining COT duration either because representing it requires more bits than are available to do so the X symbols indicated is the full remaining COT duration or a lower bound for the full remaining COT duration.

The COT indicator 806 may include the following for COT 804: {X=56 symbols, Longer-than-X=1} or {X=4 ms, Longer-than-X=1}, which indicates that 56 is the number of symbols (or 4 ms is) remaining in the COT duration. If the COT indicator 816 indicates that the Longer-than-X flag is set to one, the actual COT duration is greater than the X number of symbols (or slots) indicated in the COT indicator (e.g., 56 symbols or 4 slots). In this example, the BS may provide an incremental indication of the COT duration. If the COT indicator 816 indicates that the Longer-than-X flag is set to zero, X does not include indication of the remaining COT duration. The COT indicator 806 indicates that the Longer-than-X flag is set to one, which indicates that the actual remaining COT duration is greater than the indicated 56 symbols or 4 ms.

In some examples, the UE may transmit an UL communication signal based on the indicated COT duration. The UE may determine, based on the COT indicator 806, whether the UE is able to transmit the UL communication signal before the end of the COT 804. In an example, if the Longer-than-X flag is set to one, the UE may determine that it can transmit the UL communication signal before the end of the COT 804. In this example, the UE may perform a category 2 LBT and transmit the UL communication signal if the category 2 LBT results in an LBT pass. In another example, if the Longer-than-X flag is set to zero, the UE determines whether it can transmit the UL communication signal before the end of the indicated COT duration. In response to a determination that the UE can transmit the UL communication signal before the end of the indicated COT duration, the UE perform a category 2 LBT and transmit the UL communication signal if the category 2 LBT results in an LBT pass. In response to a determination that the UE cannot transmit the UL communication signal before the end of the indicated COT duration, the UE perform a category 4 LBT and transmit the UL communication signal if the category 4 LBT results in an LBT pass. The BS may receive the UL communication signal from the UE.

If the Longer-than-X flag is set to one, the UE may expect another COT indicator before the next X symbols. In some examples, the UE may receive a DL transmission based on the indicated COT duration indication. In an example, if the UE determines that the Longer-than-X flag is set to zero, the UE may monitor the PDCCH past the indicated COT duration. In another example, if the UE determines that the Longer-than-X flag is set to zero, the UE may continue to monitor the PDCCH for not longer than the indicated COT duration. The UE may continue to use a first search space group with a more frequent monitoring pattern (e.g., at intervals of about 2 symbols or about 3 symbols) if the UE determines that it is not within the COT 804 and may switch to a second search space group with a slower frequent monitoring pattern upon a detection that the UE is within the COT 804.

If the UE does not receive another COT indicator before X, the UE may determine that the COT has ended. At Time T1, which is subsequent to time T0, and the BS transmits a COT indicator 816 indicating the COT duration and the Longer-than-X flag. The COT indicator 816 may include the following for the COT 804: {X=56 symbols, Longer-than-X=1} or {X=4 ms, Longer-than-X=1}. The BS may also transmit DL data 818. The COT indicator 816 indicates that the Longer-than-X flag is set to one, which indicates that the actual remaining COT duration is greater than the indicated 56 symbols or 4 ms.

At Time T2, the BS transmits a COT indicator 826 indicating the COT duration and the Longer-than-X flag. The COT indicator 826 may include the following: {X=28 symbols, Longer-than-X=0} or {X=2 ms, Longer-than-X=0}. The BS may also transmit DL data 828 and DL data 830. The COT indicator 816 indicates that the Longer-than-X flag is set to zero, which indicates that X is an accurate number of symbols or slots remaining in the COT. In this example, the remaining COT duration is 28 symbols or 2 ms. In an example, if the UE determines that the Longer-than-X flag is set to zero and was set to one in the previous COT indicator, the UE may shorten the length of time that the UE monitors for PDCCH.

Accordingly, in some examples, X is the number of symbols indicated by the duration bits. If the Longer-than-X flag is set, the actual COT duration is >X. Conversely, if the Longer-than-X flag is cleared, the COT duration=X.

In some examples, the COT indicator may indicate X in symbols or multiples of symbols. In an example with a multiple of two symbols, the X symbols indicated by the COT indicator may indicate 2X symbols and the Longer-than-X flag may mean Longer-than-2X symbols.

Figure 9:
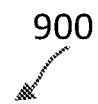
FIG. 9 illustrates a communication scheme for indicating a duration of a COT according to some embodiments of the present disclosure.

FIG. 9 illustrates a communication scheme 900 for indicating a duration of a COT according to some embodiments of the present disclosure. The scheme 900 may use a lookup table 900 that is employed by UEs such as the UEs 115 and/or BSs such as BSs 105 in a network such as the network 100. Additionally, the lookup table 900 may be specification defined or RRC configured (e.g., the number of entries in the lookup table, bit combination, and/or mapping values for remaining COT duration). The lookup table 900 provides four bits for a bit combination for indicating a COT duration. In this example, it may be unnecessary to include a Longer-than-X flag as discussed in relation to FIG. 8.

A binary number with six bits may represent numbers between 0 and 57. In the lookup table 900, the bits indicating the remaining COT duration may be coded together with the Longer-than-X flag. For the first and second entries of the lookup table 900, the translations are more granular and the granularity increases. As shown in the first entry of the lookup table 900, bits representing the decimal numbers 0-6 may indicate 1-7 symbols for a COT duration, respectively (e.g., the "0000" indicates a COT duration of 1 symbol, "0001" indicates a COT duration of 2 symbols, "0010" indicates a COT duration of 3 symbols, "0011" indicates a COT duration of 4 symbols, "0100" indicates a COT duration of 5 symbols, "0101" indicates a COT duration of 6 symbols, and "0110" indicates a COT duration of 7 symbols. As shown in the second entry of the lookup table 900, bits representing the decimal number 7 indicate a COT duration of 8 symbols, bits representing the decimal number 8 indicate a COT duration of 10 symbols, bits representing the decimal number 9 indicate a COT duration of 12 symbols, and bits representing the decimal number 10 indicate a COT duration of 14 symbols. The lookup table 900 may be non-linear in terms of the bit combinations that indicate symbols, as shown in this second entry.

Additionally, bits representing the decimal number 11 indicate a COT duration that is greater than one slot, bits representing the decimal number 12 indicate a COT duration that is greater than two slots, bits representing the decimal number 13 indicate a COT duration that is greater than three slots, bits representing the decimal number 14 indicate a COT duration that is greater than four slots, and bits representing the decimal number 15 indicate a COT duration that is greater than five slots. In general, the remaining COT duration can be indicated using a linear time step-size or a non-linear time step-size.

Figure 10:
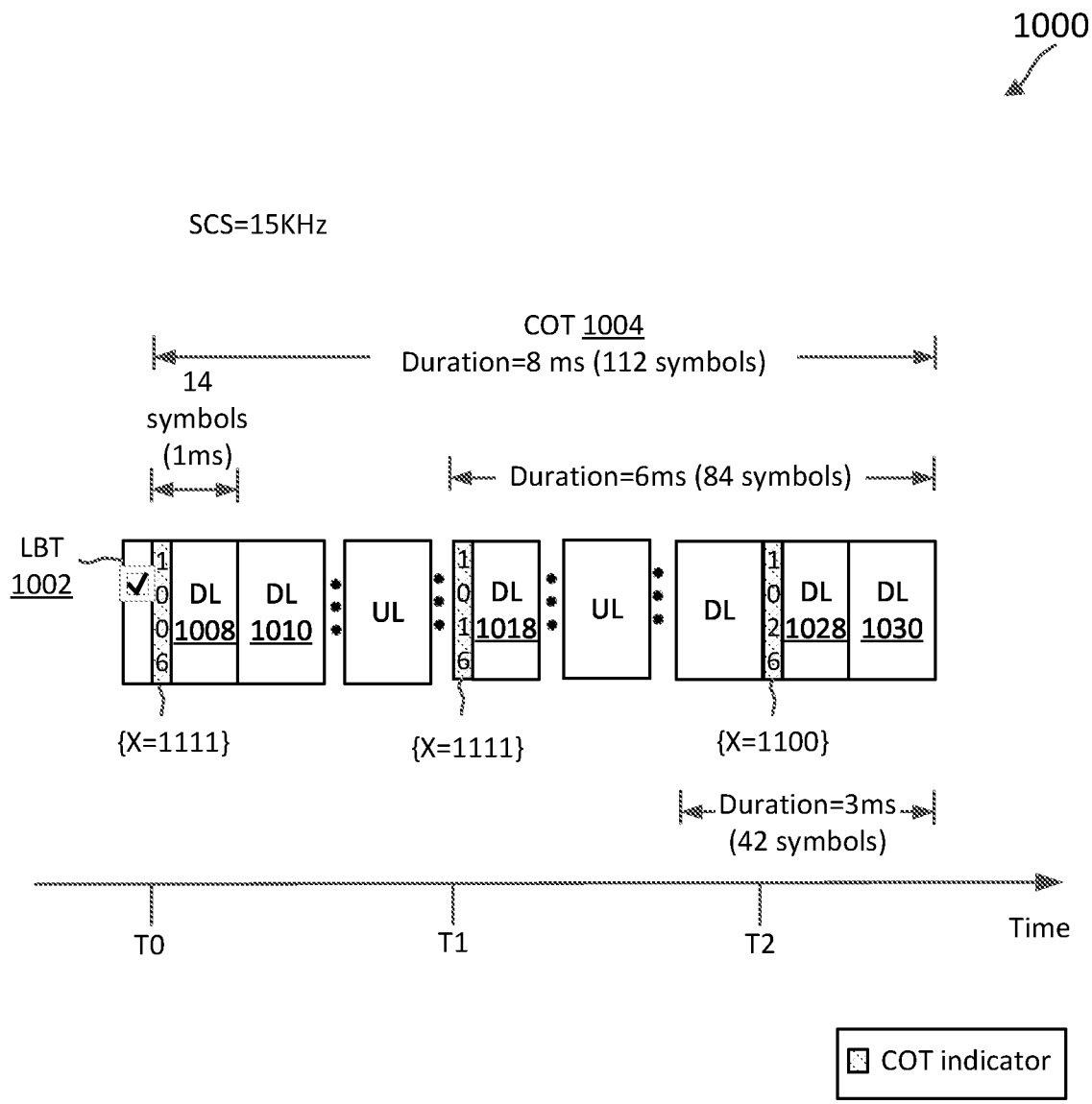
FIG. 10 illustrates a communication scheme for indicating a duration of a COT according to some embodiments of the present disclosure.

FIG. 10 illustrates a communication scheme 1000 for indicating a duration of a COT according to some embodiments of the present disclosure. The communication scheme 1000 may be employed by UEs such as the UEs 115 and/or BSs such as BSs 105 in a network such as the network 100. In FIG. 10, the x-axis represents time in some constant units.

In the example illustrated in FIG. 10, the subcarrier spacing may occur with 15 kHz Additionally, one slot is 14 symbols, and the COT duration is 112 symbols or 8 ms. Before Time T0, the BS may perform an LBT 1002 in a subband. As indicated by a checkmark in the LBT 1002, the LBT 1002 results in an LBT pass and the BS reserves a COT 1004 in the subband. At Time T0, the BS transmits a COT indicator 1006 indicating a duration of the COT 1004. The BS may also transmit DL data 1008 and DL data 1010 based on the LBT pass.

The duration of the COT 1004 may be indicated in a number of symbols, in T ms, or any other format. In some examples, the COT indicator may indicate X symbols using the entries in the lookup table 900. For example, the remaining COT duration is 112 symbols, 8 ms, or 8 slots. In the lookup table 900, the binary number "1111" represents "15" in decimal form and maps to a COT duration of greater than 5 slots. The COT indicator 1006 may include the following for COT 1004: {X=1111}, which indicates that the COT duration is greater than 5 slots. Accordingly, the UE determines that the remaining COT duration for COT 1004 is greater than 5 slots.

In some examples, the UE may transmit an UL communication signal based on the indicated COT duration. The UE may determine, based on the COT indicator 1006, whether the UE is able to transmit the UL communication signal before the end of the COT 1004. In an example, if the Longer-than-X flag is set to one, the UE may determine that it can transmit the UL communication signal before the end of the COT 1004. In this example, the UE may perform a category 2 LBT and transmit the UL communication signal if the category 2 LBT results in an LBT pass. In another example, if the Longer-than-X flag is set to zero, the UE determines whether it can transmit the UL communication signal before the end of the indicated COT duration. In response to a determination that the UE can transmit the UL communication signal before the end of the indicated COT duration, the UE perform a category 2 LBT and transmit the UL communication signal if the category 2 LBT results in an LBT pass. In response to a determination that the UE cannot transmit the UL communication signal before the end of the indicated COT duration, the UE performs a category 4 LBT and transmits the UL communication signal if the category 4 LBT results in an LBT pass. The BS may receive the UL communication signal from the UE.

In some examples, the UE may receive a DL transmission based on the indicated COT duration indication. The UE may continue to use a first search space group with a more frequent monitoring pattern (e.g., at intervals of about 2 symbols or about 3 symbols) if the UE determines that it is not within the COT 1004 and may switch to a second search space group with a slower frequent monitoring pattern upon a detection that the UE is within the COT 1004.

At Time T1, which is subsequent to time T0, the COT duration is 6 ms or 84 symbols. The BS transmits a COT indicator 1016 including the following for COT 1004: {X=1111}, which indicates that the COT duration is greater than 5 slots. The BS may also transmit DL data 1018. In response to a determination that the UE may transmit an UL communication signal within the COT 1004, the UE may perform category 2 LBTs before the UL transmissions. In response to a determination that the UE may not transmit an UL communication signal within the COT 1004 (will transmit outside the COT 1004), the UE may perform category 4 LBTs before the UL transmissions. Additionally, in response to a determination that the UE is not within the COT (outside of the COT duration), the UE may use a first search space group with a more frequent monitoring pattern (e.g., at intervals of about 2 symbols or about 3 symbols). In response to a determination that the UE may is within the COT, the UE may switch to a second search space group with a less frequent monitoring pattern upon a detection that the UE is within the COT.

At Time T2, which is subsequent to time T1, the COT duration is 3 ms or 42 symbols. The BS transmits a COT indicator 1026 including the following for COT 1004: {X=1100}, which indicates that the COT duration is greater than 2 slots. The UE may perform category 2 LBT or category 4 LBT in the subband based on whether the UE determines that the UE is within the COT, indicated by the COT duration. Additionally, the UE may perform faster or slower PDCCH monitoring based on whether the UE determines that the UE is within the COT, indicated by the COT duration.

The specified bit combinations may be used to indicate the corresponding remaining COT durations. The UE may expect the next COT indicator before the minimum duration that is indicated. In relation to FIGS. 8-11, if the UE does not receive a COT indicator before the indicated remaining COT duration, the UE may determine that it is outside the COT reserved by the BS (e.g., the COT reserved by the BS has ended) and accordingly determine to not transmit PUCCH and/or PUSCH. Further, in relation to FIGS. 8-11, if the UE does not receive a COT indicator before the indicated remaining COT duration, the UE may determine that it is outside the COT reserved by the BS (e.g., the COT reserved by the BS has ended) and accordingly does not receive or process any P-CSI-RSs in the plurality of subbands. Furthermore, in relation to FIGS. 8-11, if the UE does not receive a COT indicator before the indicated remaining COT duration, the UE may continue to monitor PDCCH on all subbands after the indicated remaining COT duration. The UE may assume that it is inside the COT monitoring configuration until a timer expiry. The timer value may be set via RRC signaling. After the timer expiry, the UE may start monitoring the PDCCH as if outside the COT reserved by the BS.

As discussed above, as soon as the BS passes the LBT in a subband, the BS may start DL transmissions. Before the LBT passes, the BS may encode a scheduling grant (e.g., a DL or an UL scheduling grant) and start preparing a DL data packet for transmission in the subband. The BS may prepare the payload for transmitting the COT indicator before the LBT passes in the subband. Accordingly, by the time the BS transmits the COT indicator, the COT indicator may not be an accurate depiction of the remaining COT duration. For example, if the BS starts and/or passes the LBT earlier in the COT, the BS may have a longer COT duration. In another example, if the BS passes the LBT later into the COT, the BS may want to pause or end the COT earlier for various reasons (e.g., an upcoming RACH occasion, a start of a discovery reference signal (DRS) measurement timing configuration (DMTC) window, etc.). In this example, the BS may want to adapt the COT duration by changing it.

The BS may be unable to change a COT duration in a payload of the COT indicator because it has already been prepared and after LBT pass, the BS may not have enough time to change the payload. In some examples, the BS pre-prepares a COT indicator with a tentative small COT duration, with a small value for X symbols (e.g., X=10 symbols and Longer-than-X flag is set to one). The BS may transmit a next COT indicator indicating the exact remaining duration (if within the possible bits). The BS may increase the total COT duration in a next COT indicator, but may not decrease the total COT duration (e.g., an end of the COT can be extended but not be reduced in a following COT indicator). The UE may receive the total COT duration, which was decreased in the next COT indicator.

In some examples, the BS determines to adapt the duration of the COT. When the BS wants to adapt the COT duration, the BS may provide a tentative lower bound for the COT duration (not an exact value) in the first indicator, and then later provides the exact COT duration. In an example, the first indicator may indicate a first value representing a total duration of the COT, the second indicator may indicate a second value representing the total duration of the COT, and the first value is less than the second value. In another example, the first indicator may indicate a first value representing a lower bound for the total duration of the COT, the second indicator may indicate a second value representing the total duration of the COT, and the first value is less than the second value.

In some examples, the BS controls whether the UE performs category 4 LBT or category 2 LBT in a subband and/or switches from one LBT mode to the other LBT mode. The BS is unaware of when an LBT will pass in a subband, and accordingly may not know whether to instruct the UE to perform category 4 LBT or category 2 LBT in the subband. To compensate for this lack of knowledge of the LBT pass, the BS may adapt this information and use it in the next COT indicators associated with RACH, CG-UL, and/or scheduled PUCCH/PUSCH.

Typically, RACH and CG-UL are RRC configured. The UE does not receive an explicit grant to transmit RACH or CG-UL and thus the UE typically performs category 4 LBT for RACH and CG-UL transmissions. In one example, the BS may maintain a RACH flag to indicate whether to allow a switch from the category 4 LBT to the category 2 LBT for RACH when the BS acquires a COT with a duration including the RACH occasion. For example, the RACH flag may indicate whether to allow category 4 LBT or category 2 LBT for an indicated COT duration. In this example, the determination of whether to instruct the UE to perform the category 4 LBT or category 2 LBT may be based on the subband usage indication and/or COT duration. In one example, the BS may maintain a CG-UL flag to indicate whether to allow a switch from the category 4 LBT to the category 2 LBT for CG-UL. For example, the CG-UL flag may indicate whether to allow category 4 LBT or category 2 LBT for the indicated COT duration. In this example, the determination of whether to instruct the UE to perform the category 4 LBT or category 2 LBT may be based on the COT duration indicated in the COT indicator.

A scheduled UL transmission may be from a previous COT or the current COT. The BS may acquire a COT and during the COT, the BS may schedule an UL transmission (e.g., PUSCH and/or PUCCH) in a period outside of the COT. Thus, the BS may indicate a category 4 LBT for the scheduled UL transmission. However, the BS may subsequently acquire another COT with a duration including the UL transmission period scheduled from the earlier COT. In one example, the BS may maintain a scheduled-UL flag to indicate whether to allow a switch from the category 4 LBT to the category 2 LBT for PUSCH/PUCCH scheduled from an earlier COT. For example, the scheduled-UL flag may indicate whether to allow category 4 LBT or category 2 LBT for the subband that is scheduled for the UL transmission. In this example, the determination of whether to instruct the UE to perform the category 4 LBT or category 2 LBT may be based on the COT duration indicated in the COT indicator.

Figure 11:
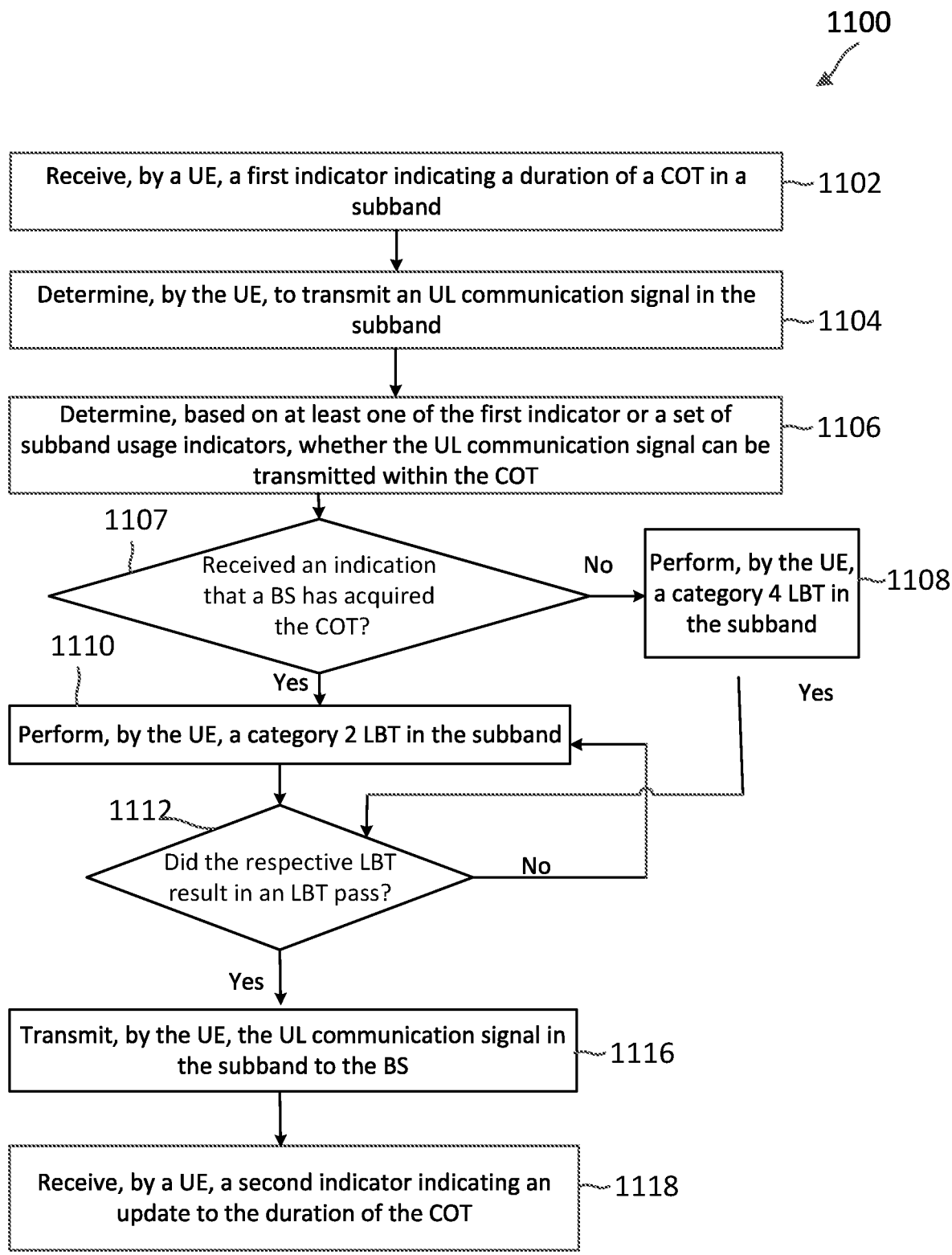
FIG. 11 is a flow diagram of a communication method for transmitting an UL communication signal based on a duration of a COT according to some embodiments of the present disclosure.

FIG. 11 is a flow diagram of a communication method 1100 for transmitting an UL communication signal based on a duration of a COT according to some embodiments of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115, may utilize one or more components, such as a processor, a memory, a subband indication module, a signaling module, a transceiver, a modem, and the one or more antennas, to execute the steps of method 1100 (see FIG. 13). The method 1100 may employ similar mechanisms as in the communication scheme 800, the communication scheme 900, and/or the communication scheme 1000 described above with respect to FIGS. 8, 9, and/or 10, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1102, the method 1100 includes receiving, by the UE, a first indicator indicating a duration of a COT in a subband. At step 1104, the method 1100 includes determining, by the UE, to transmit an UL communication signal in the subband. At step 1106, the method 1100 includes determining, based on at least one of the first indicator or a set of subband usage indicators, whether the UL communication signal can be transmitted within the COT. At step 1107, the method 1100 includes determining whether the UE has received an indication that a BS has acquired the COT. If the UE has not received an indication that the BS has acquired the COT, process flow may proceed from step 1107 to step 1108, in which the UE performs a category 4 LBT in a subband. If the UE has received an indication that the BS has acquired the COT, process flow proceeds from step 1107 to step 1110, in which the UE performs a category 2 LBT in the subband.

At step 1112, the method 1100 includes determining whether the respective LBT results in an LBT pass. If the respective LBT does not result in an LBT pass, process flow may proceed back to step 1110, in which the UE performs another category 2 LBT in the subband. If the respective LBT results in an LBT pass, process flow may proceed back to step 1116, in which the UE transmits the UL communication signal in the subband to the BS. For example, the UE may transmit PUCCH or PUSCH based on the LBT pass. At step 1118, the method 1100 includes receiving, by the UE, a second indicator indicating an update to the duration of the COT.

Figure 12:
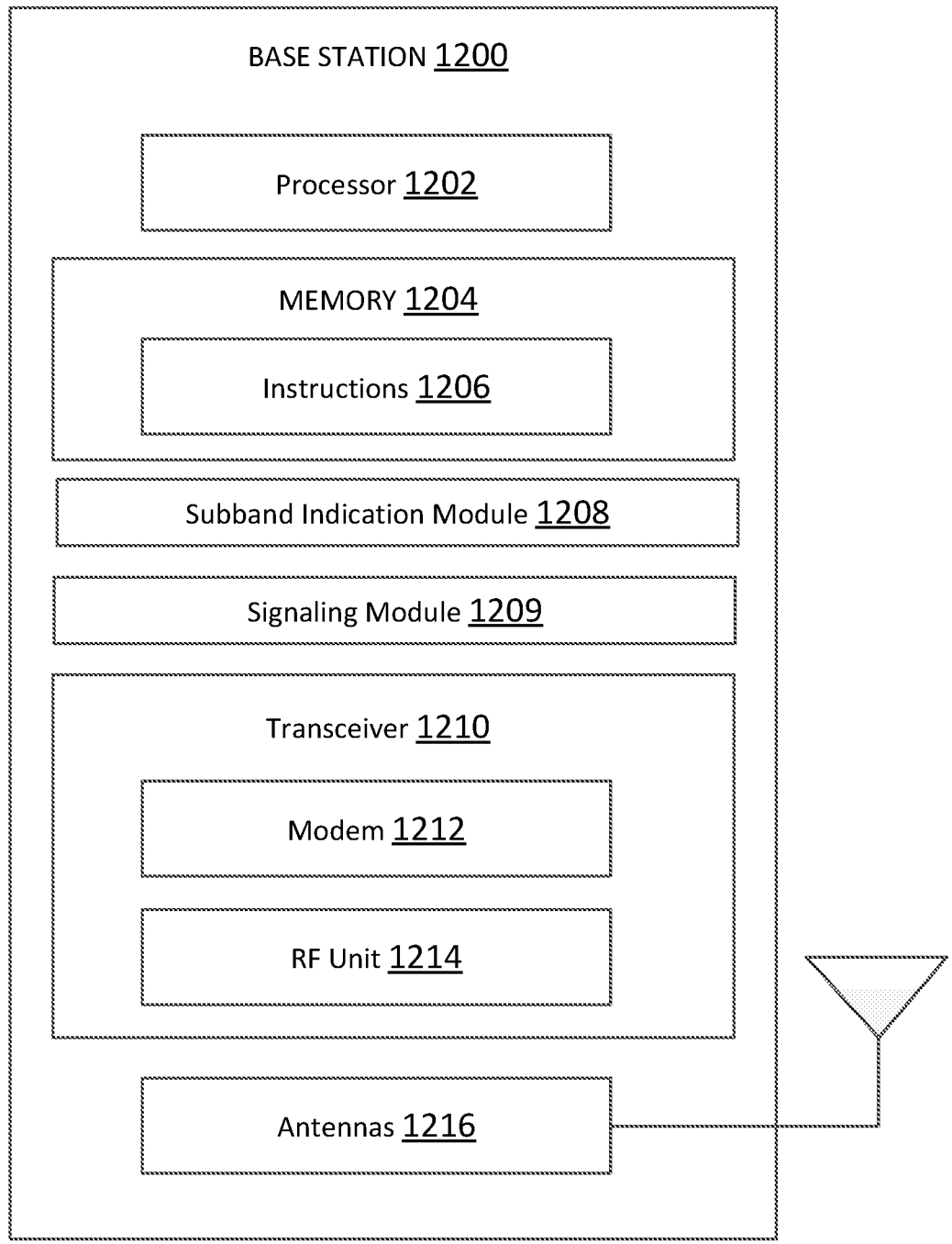
FIG. 12 is a block diagram of an exemplary base station (BS) according to some embodiments of the present disclosure.

FIG. 12 is a block diagram of an exemplary BS 1200 according to some embodiments of the present disclosure. The BS 1200 may be a BS 105 as discussed above. As shown, the BS 1200 may include a processor 1202, a memory 1204, a subband indication module 1208, a signaling module 1209, a transceiver 1210 including a modem subsystem 1212 and a radio frequency (RF) unit 1214, and one or more antennas 1216. These elements may be in direct or indirect communication with each other, for example via one or more buses.

The processor 1202 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some embodiments, the memory 1204 includes a non-transitory computer-readable medium. The memory 1204 may store instructions 1206. The instructions 1206 may include instructions that, when executed by the processor 1202, cause the processor 1202 to perform the operations described herein with reference to the BSs 105 in connection with embodiments of the present disclosure. Instructions 1206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The subband indication module 1208 and/or the signaling module 1209 may be implemented via hardware, software, or combinations thereof. For example, the subband indication module 1208 and/or the signaling module 1209 may be implemented as a processor, circuit, and/or instructions 1206 stored in the memory 1204 and executed by the processor 1202. The subband indication module 1208 and/or the signaling module 1209 may be used for various aspects of the present disclosure.

In some examples, the subband indication module 1208 may be configured to communicate with a UE, a first indicator indicating at least one of a subband configuration for a channel occupancy time or a duration of the COT. The signaling module 1209 may be configured to communicate with the UE during the COT, a first communication signal based on the at least one of the subband configuration for the COT or the duration of the COT. The subband indication module 1208 may be configured to communicate with the UE during the COT, a second indicator indicating an update for the at least one of the subband configuration for the COT or the duration of the COT. The signaling module 1209 may be configured to communicate with the UE during the COT, a second communication signal based on the update.

As shown, the transceiver 1210 may include the modem subsystem 1212 and the RF unit 1214. The transceiver 1210 can be configured to communicate bi-directionally with other devices, such as the UEs 115 or other BSs 105. The modem subsystem 1212 may be configured to modulate and/or encode the data from the memory 1204, the subband indication module 1208, and/or the signaling module 1209 according to a Modulation Coding Scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data from the modem subsystem 1212 (on outbound transmissions) or of transmissions originating from another source such as a UE 115 or BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the BS 105 or 1200 to enable the BS 105 or 1200 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may further receive data messages transmitted from other devices and provide the received data messages for processing and/or demodulation at the transceiver 1210. The antennas 1216 may include multiple antennas of similar or different designs in order to sustain multiple transmission links.

Figure 13:
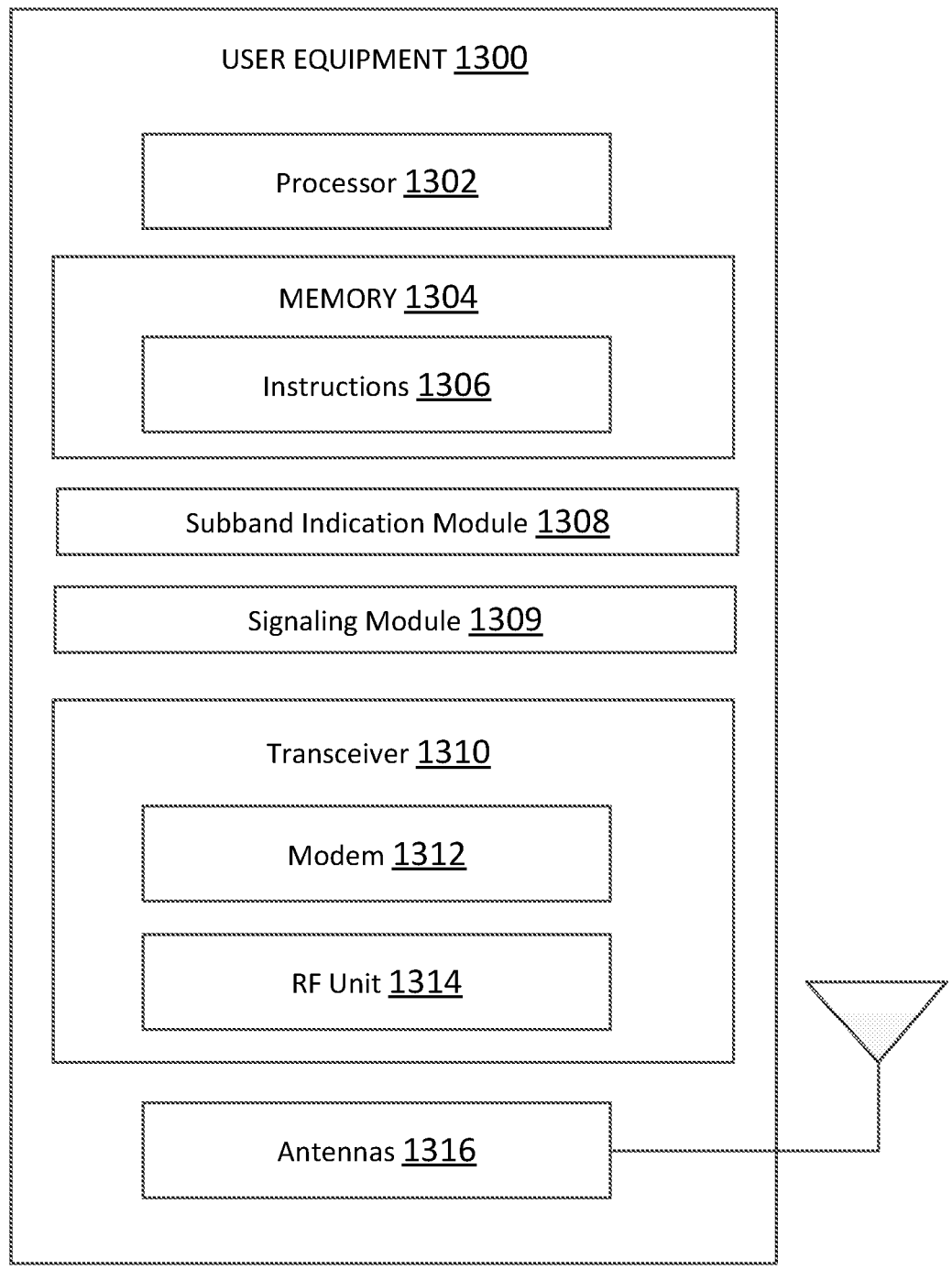
FIG. 13 is a block diagram of an exemplary user equipment (UE) according to some embodiments of the present disclosure.

FIG. 13 is a block diagram of an exemplary UE 1300 according to some embodiments of the present disclosure. The UE 1300 may be a UE 115 as discussed above. As shown, the UE 1300 may include a processor 1302, a memory 1304, a subband indication module 1308, a signaling module 1309, a transceiver 1310 including a modem subsystem 1312 and an RF unit 1314, and one or more antennas 1316. These elements may be in direct or indirect communication with each other, for example, via one or more buses.

The processor 1302 may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, solid state memory device, hard disk drives, memristor-based arrays, other forms of volatile and non-volatile memory, or a combination of different types of memory. In some embodiments, the memory 1304 includes a non-transitory computer-readable medium. The memory 1304 may store instructions 1306. The instructions 1306 may include instructions that, when executed by the processor 1302, cause the processor 1302 to perform operations described herein with reference to the UEs 115 in connection with embodiments of the present disclosure. Instructions 1306 may also be referred to as code, which may be interpreted broadly to include any type of computer-readable statement(s) as discussed above with respect to FIG. 12.

The subband indication module 1308 and/or the signaling module 1309 may be implemented via hardware, software, or combinations thereof. For example, the subband indication module 1308 and/or the signaling module 1309 may be implemented as a processor, circuit, and/or instructions 1306 stored in the memory 1304 and executed by the processor 1302. The subband indication module 1308 and/or the signaling module 1309 may be used for various aspects of the present disclosure.

In some examples, the subband indication module 1309 may be configured to communicate with a BS, a first indicator indicating at least one of a subband configuration for a channel occupancy time or a duration of the COT. The signaling module 1309 may be configured to communicate with the BS during the COT, a first communication signal based on the at least one of the subband configuration for the COT or the duration of the COT. The subband indication module 1309 may be configured to communicate with the BS during the COT, a second indicator indicating an update for the at least one of the subband configuration for the COT or the duration of the COT. The signaling module 1309 may be configured to communicate with the BS during the COT, a second communication signal based on the update.

As shown, the transceiver 1310 may include the modem subsystem 1312 and the RF unit 1314. The transceiver 1310 can be configured to communicate bi-directionally with other devices, such as the UEs 115 and/or another element in the network. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data from the modem subsystem 1312 (on outbound transmissions) or of transmissions originating from another source such as a UE 115 or BS 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 or 1300 to enable the UE 115 or 1300 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The antennas 1316 may include multiple antennas of similar or different designs in order to sustain multiple transmission links. The RF unit 1314 may configure the antennas 1316.

Figure 14:
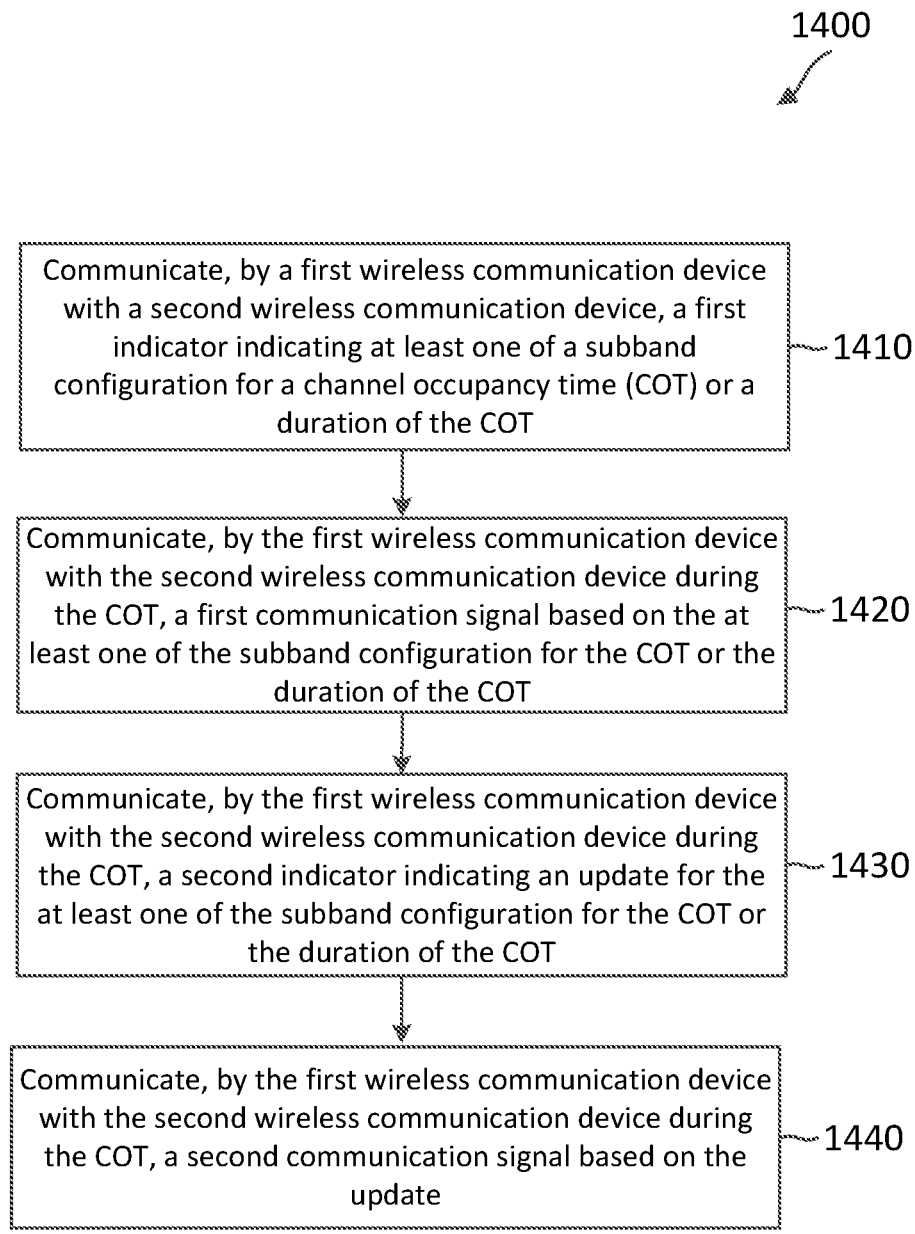
FIG. 14 is a flow diagram of a communication method according to some embodiments of the present disclosure.

FIG. 14 is a flow diagram of a communication method 1400 according to some embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115 and/or UE 1300, may utilize one or more components, such as the processor 1302, the memory 1304, the subband indication module 1308, the signaling module 1309, the transceiver 1310, the modem 1312, and the one or more antennas 1316, to execute the steps of method 1400. In another example, a wireless communication device, such as the BS 105 and/or BS 1200, may utilize one or more components, such as the processor 1202, the memory 1204, the subband indication module 1208, the signaling module 1209, the transceiver 1210, the modem 1212, and the one or more antennas 1216, to execute the steps of method 1400. The method 1400 may employ similar mechanisms as in the communication scheme 200, the communication scheme 300, the communication scheme 400, the communication method 500, the communication scheme 600, the communication method for 700, the communication scheme 800, the communication scheme 900, the communication scheme 1000, and/or the communication scheme 1100 described above with respect to FIGS. 2, 3, 4, 5, 6, 7, 8, 9, 10, and/or 11, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a first wireless communication device with a second wireless communication device, a first indicator indicating at least one of a subband configuration for a COT or a duration of the COT. At step 1420, the method 1400 includes communicating, by the first wireless communication device with the second wireless communication device during the COT, a first communication signal based on the at least one of the subband configuration for the COT or the duration of the COT. At step 1430, the method 1400 includes communicating, by the first wireless communication device with the second wireless communication device during the COT, a second indicator indicating an update for the at least one of the subband configuration for the COT or the duration of the COT. At step 1440, the method 1400 includes communicating, by the first wireless communication device with the second wireless communication device during the COT, a second communication signal based on the update.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device, a first indicator indicating at least one of a subband configuration for a channel occupancy time (COT) or a duration of the COT;
   communicating, by the first wireless communication device with the second wireless communication device during the COT, a first communication signal based on the at least one of the subband configuration for the COT or the duration of the COT;
   communicating, by the first wireless communication device with the second wireless communication device during the COT, a second indicator indicating an update for the at least one of the subband configuration for the COT or the duration of the COT, wherein the second indicator comprises an uplink (UL) grant indicating one or more valid subbands of the subband configuration based on one or more listen-before-talk (LBT) results at a base station (BS); and
   communicating, by the first wireless communication device with the second wireless communication device during the COT, a second communication signal based on the update.

2. The method of claim 1, wherein the first indicator indicates the subband configuration for the COT, and wherein communicating the first indicator includes communicating a first bitmap indicating that subband usage by the BS) is unknown.

3. The method of claim 2, wherein the subband configuration is associated with a plurality of subbands including a first set of subbands and a second set of subbands, and wherein communicating the second indicator includes communicating a second bitmap indicating that the first set of subbands is valid and the second set of subbands is invalid.

4. The method of claim 1, further comprising:
   receiving a downlink (DL) grant for a DL transmission in a subband; and
   determining that the subband is valid in response to receiving the DL grant for the DL transmission in the subband, wherein communicating the second indicator includes receiving the DL grant.

5. The method of claim 1, further comprising:
   determining whether a subband is valid;
   in response to a determination that the subband is valid, performing a category 2 LBT in the subband, wherein communicating the first communication signal includes transmitting an uplink (UL) transmission in the subband based on the category 2 LBT; and
   in response to a determination that the subband is not valid, performing a category 4 LBT in the subband, wherein communicating the first communication signal includes transmitting the UL transmission in the subband based on the category 4 LBT.

6. The method of claim 1, wherein communicating the first indicator includes receiving the first indicator from the BS, the method further comprising:
   determining whether subband usage by the BS is known;
   monitoring a physical downlink control channel (PDCCH) based on a first search space group with a first monitoring pattern in response to a determination that the subband usage by the BS is not known; and
   monitoring the PDCCH based on a second search space group with a slower frequency monitoring pattern than the first monitoring pattern in response to a determination that the subband usage by the BS is known.

7. The method of claim 1, further comprising:
   detecting a periodic channel state information reference signal (P-CSI-RS) in a subband from the BS;
   determining whether the subband is valid, wherein communicating the first communication signal includes transmitting a channel state information (C SI) report based on the P-CSI-RS to the BS in response to a determination that the subband is valid; and
   determining to not transmit the CSI report in response to a determination that the subband is not valid.

8. The method of claim 1, wherein the first indicator indicates a bit combination representing the duration of the COT.

9. The method of claim 8, wherein a lookup table includes the bit combination that maps to a number of symbols indicating the duration of the COT.

10. The method of claim 1, further comprising:
determining, based on the first indicator, whether transmission of the first communication signal in a subband is within the COT;
in response to a determination that the transmission is within the COT, performing a category 2 LBT in the subband, wherein communicating the first communication signal includes transmitting a UL transmission in the subband based on the category 2 LBT; and
in response to a determination that the transmission is not within the COT, performing a category 4 LBT in the subband, wherein communicating the first communication signal includes transmitting the UL transmission in the subband based on the category 4 LBT.

11. The method of claim 1, further comprising:
communicating a flag indicating whether to allow the second wireless communication device to switch from a category 4 LBT to a category 2 LBT for a random access channel (RACH) occasion in the COT, the flag being based on at least one of the subband configuration for the COT or the duration of the COT.

12. The method of claim 1, further comprising:
communicating a flag indicating whether to allow the second wireless communication device to switch from a category 4 LBT to a category 2 LBT for a configured-grant UL (CG-UL) in the COT, the flag being based on at least one of the subband configuration for the COT or the duration of the COT.

13. The method of claim 1, further comprising:
communicating a flag indicating whether to allow the second wireless communication device to switch from a category 4 LBT to a category 2 LBT for a scheduled physical uplink control channel (PUCCH) in the COT, the scheduled PUCCH being scheduled for the category 4 LBT in a previous COT, and the flag being based on at least one of the subband configuration for the COT or the duration of the COT.

14. The method of claim 1, further comprising:
communicating a flag indicating whether to allow the second wireless communication device to switch from a category 4 LBT to a category 2 LBT for a scheduled physical uplink shared channel (PUSCH) in the COT, wherein the scheduled PUSCH being scheduled for the category 4 LBT in a previous COT, and the flag being based on the at least one of the subband configuration for the COT or the duration of the COT.

15. The method of claim 1, wherein communicating the first communication signal includes:
transmitting a UL transmission in a subband based on a category 2 LBT pass in response to the first indicator indicating that the subband is valid; and
transmitting the UL transmission in the subband based on a category 4 LBT pass in response to the first indicator indicating that the subband is not valid.

16. An apparatus, comprising:
a transceiver configured to:
communicate, by a first wireless communication device with a second wireless communication device, a first indicator indicating at least one of a subband configuration for a channel occupancy time (COT) or a duration of the COT;
communicate, by the first wireless communication device with the second wireless communication device during the COT, a first communication signal based on the at least one of the subband configuration for the COT or the duration of the COT;
communicate, by the first wireless communication device with the second wireless communication device during the COT, a second indicator indicating an update for the at least one of the subband configuration for the COT or the duration of the COT, wherein the second indicator comprises an uplink (UL) grant indicating one or more valid subbands of the subband configuration based on one or more listen-before-talk (LBT) results at a base station (BS); and
communicate, by the first wireless communication device with the second wireless communication device during the COT, a second communication signal based on the update.

17. The apparatus of claim 16, wherein the first indicator indicates the subband configuration for the COT, and wherein the transceiver communicates a first bitmap indicating that subband usage by the BS is unknown.

18. The apparatus of claim 17, wherein the subband configuration is associated with a plurality of subbands including a first set of subbands and a second set of subbands, and wherein the transceiver communicates a second bitmap indicating that the first set of subbands is valid and the second set of subbands is invalid.

19. The apparatus of claim 16, wherein the transceiver is configured to receive a downlink (DL) grant for a DL transmission in a subband, the apparatus further comprising:
a processor that is configured to determine that the subband is valid in response to receiving the DL grant for the DL transmission in the subband; and
wherein the transceiver is configured to receive the DL grant.

20. The apparatus of claim 16, wherein the first indicator indicates a bit combination representing the duration of the COT.

21. The apparatus of claim 20, wherein a lookup table includes the bit combination that maps to a number of symbols indicating the duration of the COT.

22. The apparatus of claim 16, wherein the transceiver is configured to communicate a flag indicating whether to allow the second wireless communication device to switch from a category 4 LBT to a category 2 LBT for a random access channel (RACH) occasion in the COT, wherein the flag is based on at least one of the subband configuration for the COT or the duration of the COT.

23. The apparatus of claim 16, wherein the transceiver is configured to communicate a flag indicating whether to allow the second wireless communication device to switch from a category 4 LBT to a category 2 LBT for a configured-grant UL (CG-UL) in the COT, wherein the flag is based on at least one of the subband configuration for the COT or the duration of the COT.

24. The apparatus of claim 16, wherein the transceiver is configured to communicate a flag indicating whether to allow the second wireless communication device to switch from a category 4 LBT to a category 2 LBT for a scheduled physical uplink control channel (PUCCH) in the COT, wherein the scheduled PUCCH is scheduled for the category 4 LBT in a previous COT, and the flag is based on at least one of the subband configuration for the COT or the duration of the COT.

25. The apparatus of claim 16, wherein the transceiver is configured to communicate a flag indicating whether to allow the second wireless communication device to switch from a category 4 LBT to a category 2 LBT for a scheduled physical uplink shared channel (PUSCH) in the COT, wherein the scheduled PUSCH is scheduled for the category 4 LBT in a previous COT, and the flag is based on at least one of the subband configuration for the COT or the duration of the COT.

26. A non-transitory computer-readable medium having program code recorded thereon for execution by a processor, the program code comprising:
    code for causing a first wireless communication device to communicate with a second wireless communication device, a first indicator indicating at least one of a subband configuration for a channel occupancy time (COT) or a duration of the COT;
    code for causing the first wireless communication device to communicate with the second wireless communication device, a first communication signal based on the at least one of the subband configuration for the COT or the duration of the COT;
    code for causing the first wireless communication device to communicate with the second wireless communication device, a second indicator indicating an update for the at least one of the subband configuration for the COT or the duration of the COT, wherein the second indicator comprises an uplink (UL) grant indicating one or more valid subbands of the subband configuration based on one or more listen-before-talk (LBT) results at a base station (BS); and
    code for causing the first wireless communication device to communicate with the second wireless communication device, a second communication signal based on the update.

27. The non-transitory computer-readable medium of claim 26, wherein a lookup table includes a bit combination that maps to a number of symbols indicating the duration of the COT, and the first indicator indicates the bit combination.

28. An apparatus, comprising:
    means for communicating with a second wireless communication device, a first indicator indicating at least one of a subband configuration for a channel occupancy time (COT) or a duration of the COT;
    means for communicating with the second wireless communication device during the COT, a first communication signal based on the at least one of the subband configuration for the COT or the duration of the COT;
    means for communicating with the second wireless communication device during the COT, a second indicator indicating an update for the at least one of the subband configuration for the COT or the duration of the COT, wherein the second indicator comprises an uplink (UL) grant indicating one or more valid subbands of the subband configuration based on one or more listen-before-talk (LBT) results at a base station (BS); and
    means for communicating with the second wireless communication device during the COT, a second communication signal based on the update.

* * * * *